US010380637B2

(12) United States Patent
Altberg et al.

(10) Patent No.: US 10,380,637 B2
(45) Date of Patent: *Aug. 13, 2019

(54) SYSTEMS AND METHODS TO PROVIDE VOICE CONNECTIONS VIA LOCAL TELEPHONE NUMBERS

(71) Applicant: YELLOWPAGES.COM LLC, Tucker, GA (US)

(72) Inventors: Ebbe Altberg, Mill Valley, CA (US); Christopher Scott Crothers, San Francisco, CA (US); Scott Faber, San Francisco, CA (US); Ron Hirson, San Francisco, CA (US); Paul G. Manca, Oakland, CA (US); Sean Van Der Linden, Berkeley, CA (US)

(73) Assignee: YELLOWPAGES.COM LLC, D/FW Airport, TX (US)

( * ) Notice: Subject to any disclaimer, the term of this patent is extended or adjusted under 35 U.S.C. 154(b) by 668 days.

This patent is subject to a terminal disclaimer.

(21) Appl. No.: 15/069,347

(22) Filed: Mar. 14, 2016

(65) Prior Publication Data

US 2016/0196583 A1 Jul. 7, 2016

Related U.S. Application Data

(63) Continuation of application No. 11/778,878, filed on Jul. 17, 2007, now Pat. No. 9,317,855.

(Continued)

(51) Int. Cl.
G06Q 30/00 (2012.01)
G06Q 30/02 (2012.01)
(Continued)

(52) U.S. Cl.
CPC ......... G06Q 30/0261 (2013.01); G06Q 30/02 (2013.01); G06Q 30/0241 (2013.01);
(Continued)

(58) Field of Classification Search
CPC .......... G06Q 30/0261; G06Q 30/0271; G06Q 30/0251; G06Q 30/0277; G06Q 30/0276;
(Continued)

(56) References Cited

U.S. PATENT DOCUMENTS 4,313,035 A   1/1982 Jordan et al.
4,577,065 A   3/1986 Frey et al.
(Continued)

FOREIGN PATENT DOCUMENTS

AU   699785        12/1998
AU   2004202940 A1  4/2005
(Continued)

OTHER PUBLICATIONS

U.S. Appl. No. 60/552,124, "Method and apparatus to provide pay-per-call advertising and billing," Unpublished (filed Mar. 10, 2004), (Scott Faber, Inventor).

(Continued)

Primary Examiner — Raquel Alvarez
(74) Attorney, Agent, or Firm — Mark E. Stallion; Greensfelder Hemker & Gale PC

(57) ABSTRACT

Methods and apparatuses to dynamically allocate location dependent telephone numbers to facilitate voice connections between people. One embodiment includes: responsive to a request from a user, selecting a telephone number from a plurality of telephone numbers of a connection server to match a location indicator of the request; embedding the telephone number in an advertisement, the telephone number to be used by the user to initiate a telephone call to the connection server for further connection to an advertiser of the advertisement; and providing the advertisement with the telephone number of the connection server as a response to the request. In one embodiment, responsive to receiving the telephone call at the telephone number of the connection server from the user, whether to play a prompt message to the user is determined based at least in part on statistic data about telephone calls collected at the connection server.

20 Claims, 17 Drawing Sheets

Related U.S. Application Data

(60) Provisional application No. 60/944,751, filed on Jun. 18, 2007.

(51) Int. Cl.
*H04M 15/00* (2006.01)
*H04M 7/00* (2006.01)

(52) U.S. Cl.
CPC ..... *G06Q 30/0251* (2013.01); *G06Q 30/0256* (2013.01); *G06Q 30/0257* (2013.01); *G06Q 30/0264* (2013.01); *G06Q 30/0271* (2013.01); *G06Q 30/0276* (2013.01); *G06Q 30/0277* (2013.01); *H04M 7/003* (2013.01); *H04M 15/00* (2013.01); *H04M 15/56* (2013.01); *H04M 15/8033* (2013.01)

(58) Field of Classification Search
CPC ........... G06Q 30/0241; G06Q 30/0256; G06Q 30/02; G06Q 30/0264; H04M 15/00; H04M 15/8033; H04M 15/56; H04M 7/003

See application file for complete search history.

(56) References Cited

U.S. PATENT DOCUMENTS

| | | |
|---|---|---|
| 4,631,428 A | 12/1986 | Grimes |
| 4,645,873 A | 2/1987 | Chomet |
| 4,653,090 A | 3/1987 | Hayden |
| 4,677,434 A | 6/1987 | Fascenda |
| 4,723,283 A | 2/1988 | Nagasawa et al. |
| 4,741,025 A | 4/1988 | Maruyama et al. |
| 4,751,669 A | 6/1988 | Sturgis et al. |
| 4,752,675 A | 6/1988 | Zetmeir |
| 4,788,718 A | 11/1988 | McNabb et al. |
| 4,796,293 A | 1/1989 | Blinken et al. |
| 4,847,890 A | 7/1989 | Solomon et al. |
| 4,850,007 A | 7/1989 | Marino et al. |
| 4,963,995 A | 10/1990 | Lang |
| 5,057,932 A | 10/1991 | Lang |
| 5,058,152 A | 10/1991 | Solomom et al. |
| 5,099,510 A | 3/1992 | Blinken, Jr. et al. |
| 5,148,474 A | 9/1992 | Haralambopoulos et al. |
| 5,155,743 A | 10/1992 | Jacobs |
| 5,164,839 A | 11/1992 | Lang |
| 5,262,875 A | 11/1993 | Mincer et al. |
| 5,319,542 A | 6/1994 | King, Jr. et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,436,957 A | 7/1995 | McConnell |
| 5,440,334 A | 8/1995 | Walters et al. |
| 5,448,625 A | 9/1995 | Lederman |
| 5,453,352 A | 9/1995 | Tachibana |
| 5,483,352 A | 1/1996 | Fukuyama et al. |
| 5,483,588 A | 1/1996 | Eaton et al. |
| 5,497,502 A | 3/1996 | Castille |
| 5,524,146 A | 6/1996 | Morrisey et al. |
| 5,533,107 A | 7/1996 | Irwin et al. |
| 5,537,314 A | 7/1996 | Kanter |
| 5,539,735 A | 7/1996 | Moskowitz |
| 5,539,813 A | 7/1996 | Jonsson |
| 5,544,237 A | 8/1996 | Bales et al. |
| 5,555,298 A | 9/1996 | Jonsson |
| 5,557,677 A | 9/1996 | Prytz |
| 5,559,875 A | 9/1996 | Bieselin et al. |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,595,634 A | 1/1997 | Hearn |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,148 A | 4/1997 | Sloane |
| 5,619,555 A | 4/1997 | Fenton et al. |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,644,715 A | 7/1997 | Baugher |
| 5,675,734 A | 10/1997 | Hair |
| 5,689,553 A | 11/1997 | Ahuga et al. |
| 5,694,549 A | 12/1997 | Carlin et al. |
| 5,696,965 A | 12/1997 | Dedrick |
| 5,701,419 A | 12/1997 | McConnell |
| 5,710,887 A | 1/1998 | Chelliah et al. |
| 5,710,970 A | 1/1998 | Walters et al. |
| 5,712,979 A | 1/1998 | Graber et al. |
| 5,715,314 A | 2/1998 | Payne et al. |
| 5,715,341 A | 2/1998 | Osugi et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,724,521 A | 3/1998 | Dedrick |
| 5,734,961 A | 3/1998 | Castille |
| 5,740,231 A | 4/1998 | Cohn et al. |
| 5,740,549 A | 4/1998 | Reilly et al. |
| 5,745,681 A | 4/1998 | Levine et al. |
| 5,751,956 A | 5/1998 | Kirsch |
| 5,768,348 A | 6/1998 | Solomon et al. |
| 5,768,521 A | 6/1998 | Dedrick |
| 5,774,534 A | 6/1998 | Mayer |
| 5,777,754 A | 7/1998 | Gavan |
| 5,778,367 A | 7/1998 | Wesinger, Jr. et al. |
| 5,781,894 A | 7/1998 | Patrecca et al. |
| 5,793,851 A | 8/1998 | Albertson |
| 5,794,210 A | 8/1998 | Goldhaber et al. |
| 5,794,221 A | 8/1998 | Egendorf |
| 5,799,077 A | 8/1998 | Yoshii |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kania et al. |
| 5,835,896 A | 11/1998 | Fisher et al. |
| 5,841,763 A | 11/1998 | Leondires et al. |
| 5,842,212 A | 11/1998 | Ballurio et al. |
| 5,850,433 A | 12/1998 | Rondeau |
| 5,852,775 A | 12/1998 | Hidary |
| 5,860,068 A | 1/1999 | Cook |
| 5,862,223 A | 1/1999 | Walker et al. |
| 5,864,871 A | 1/1999 | Kitain et al. |
| RE36,111 E | 2/1999 | Neville |
| 5,867,559 A | 2/1999 | Jorgensen et al. |
| 5,870,546 A | 2/1999 | Kirsch |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,077 A | 5/1999 | Harashima |
| 5,907,677 A | 5/1999 | Glenn et al. |
| 5,911,132 A | 6/1999 | Sloane |
| 5,914,951 A | 6/1999 | Bentley et al. |

(56) References Cited

U.S. PATENT DOCUMENTS

| | | |
|---|---|---|
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,416 A | 9/1999 | Block |
| 5,963,202 A | 10/1999 | Polish |
| 5,963,861 A | 10/1999 | Hanson |
| 5,974,141 A | 10/1999 | Saito |
| 5,974,398 A | 10/1999 | Hanson et al. |
| 5,978,567 A | 11/1999 | Rebane et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,995,705 A | 11/1999 | Lang |
| 5,999,609 A | 12/1999 | Nishimura |
| 5,999,611 A | 12/1999 | Tatchell et al. |
| 5,999,965 A | 12/1999 | Kelly |
| 6,006,197 A | 12/1999 | d-Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,375 A | 2/2000 | Hall et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardner et al. |
| 6,108,704 A | 8/2000 | Hutton et al. |
| 6,130,933 A | 10/2000 | Miloslavsky |
| 6,131,085 A | 10/2000 | Rossides |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,189,030 B1 | 2/2001 | Kirsch et al. |
| 6,192,050 B1 | 2/2001 | Stovall |
| 6,199,096 B1 | 3/2001 | Mirashrafi et al. |
| 6,208,713 B1 | 3/2001 | Rahrer et al. |
| 6,212,192 B1 | 4/2001 | Mirashrafi et al. |
| 6,216,111 B1 | 4/2001 | Walker et al. |
| 6,223,165 B1 | 4/2001 | Lauffer |
| 6,230,287 B1 | 5/2001 | Pinard et al. |
| 6,243,684 B1 | 6/2001 | Stuart et al. |
| 6,259,774 B1 | 7/2001 | Miloslavsky |
| 6,269,336 B1 | 7/2001 | Ladd et al. |
| 6,269,361 B1 | 7/2001 | Davis et al. |
| 6,275,490 B1 | 8/2001 | Mattaway et al. |
| 6,292,799 B1 | 9/2001 | Peek et al. |
| 6,298,056 B1 | 10/2001 | Pendse |
| 6,301,342 B1 | 10/2001 | Ander et al. |
| 6,301,350 B1 | 10/2001 | Henningson et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,323,894 B1 | 11/2001 | Katz |
| 6,327,572 B1 | 12/2001 | Morton et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,408,278 B1 | 6/2002 | Carney et al. |
| 6,418,214 B1 | 7/2002 | Smythe et al. |
| 6,430,276 B1 | 8/2002 | Bouvier et al. |
| 6,434,527 B1 | 8/2002 | Horvitz |
| 6,438,216 B1 | 8/2002 | Aktas |
| 6,460,036 B1 | 10/2002 | Herz |
| 6,463,136 B1 | 10/2002 | Malik |
| 6,466,966 B1 | 10/2002 | Kirsch et al. |
| 6,470,079 B1 | 10/2002 | Benson |
| 6,470,181 B1 | 10/2002 | Maxwell |
| 6,470,317 B1 | 10/2002 | Ladd et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,510,434 B1 | 1/2003 | Anderson et al. |
| 6,516,057 B2 | 2/2003 | Meek et al. |
| 6,523,010 B2 | 2/2003 | Lauffer |
| 6,523,101 B1 | 2/2003 | Nakata |
| 6,529,878 B2 | 3/2003 | De Rafael et al. |
| 6,529,946 B2 | 3/2003 | Yokono et al. |
| 6,535,506 B1 | 3/2003 | Narain et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,570,870 B1 | 5/2003 | Berstis |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,690,672 B1 | 2/2004 | Klein |
| 6,731,736 B2 | 5/2004 | Meek et al. |
| 6,757,364 B2 | 6/2004 | Newkirk |
| 6,760,537 B2 | 7/2004 | Mankovitz |
| 6,769,020 B2 | 7/2004 | Miyazaki et al. |
| 6,807,532 B1 | 10/2004 | Kolls |
| 6,813,346 B2 | 11/2004 | Gruchala et al. |
| 6,836,225 B2 | 12/2004 | Lee et al. |
| 6,847,992 B1 | 1/2005 | Haitsuka et al. |
| 6,850,965 B2 | 2/2005 | Allen |
| 6,856,809 B2 | 2/2005 | Fostick |
| 6,859,833 B2 | 2/2005 | Kirsch et al. |
| 6,882,985 B1 | 4/2005 | Kay et al. |
| 6,965,870 B1 | 11/2005 | Petras et al. |
| 6,968,174 B1 | 11/2005 | Trandal et al. |
| 7,028,012 B2 | 4/2006 | St Vrain |
| 7,035,381 B2 | 4/2006 | D'Ascenzo et al. |
| 7,065,500 B2 | 6/2006 | Singh et al. |
| 7,076,037 B1 | 7/2006 | Gonen et al. |
| 7,092,901 B2 | 8/2006 | Davis et al. |
| 7,103,010 B2 | 9/2006 | Melideo |
| 7,120,235 B2 | 10/2006 | Altberg et al. |
| 7,177,415 B1 | 2/2007 | Kim et al. |
| 7,181,415 B2 | 2/2007 | Blaser et al. |
| 7,187,761 B2 | 3/2007 | Bookstaff |
| 7,200,413 B2 | 4/2007 | Montemer |
| 7,212,615 B2 | 5/2007 | Wolmuth |
| 7,224,781 B2 | 5/2007 | Jacob et al. |
| 7,227,936 B2 | 6/2007 | Bookstaff |
| 7,231,405 B2 | 6/2007 | Xia |
| 7,240,110 B2 | 7/2007 | Haitsuka et al. |
| 7,240,290 B2 | 7/2007 | Melideo |
| 7,340,048 B2 | 3/2008 | Stern et al. |
| 7,363,254 B2 | 4/2008 | Skinner |
| 7,366,683 B2 | 4/2008 | Altberg et al. |
| 7,380,139 B2 | 5/2008 | Tagawa et al. |
| 7,424,442 B2 | 9/2008 | Wong et al. |
| 7,428,497 B2 | 9/2008 | Agarwal et al. |
| 7,434,175 B2 | 10/2008 | Melideo |
| 7,453,998 B2 | 11/2008 | Jacob et al. |
| 7,505,920 B2 | 3/2009 | Agarwal et al. |
| 7,533,144 B2 | 5/2009 | Kassab |
| 7,548,915 B2 | 6/2009 | Ramer et al. |
| 7,689,466 B1 | 3/2010 | Benbrahim et al. |
| 7,734,502 B1 | 6/2010 | Yehoshua et al. |
| 7,876,886 B2 | 1/2011 | Altberg et al. |
| 8,024,224 B2 | 9/2011 | Faber et al. |
| 8,027,878 B2 | 9/2011 | Wong et al. |
| 8,077,849 B2 | 12/2011 | Altberg et al. |
| 8,095,467 B2 | 1/2012 | Beltinger |

(56) References Cited

U.S. PATENT DOCUMENTS

| | | |
|---|---|---|
| 8,121,898 B2 | 2/2012 | Altberg et al. |
| 8,140,392 B2 | 3/2012 | Altberg et al. |
| 8,180,676 B2 | 5/2012 | Altberg et al. |
| 8,484,084 B2 | 7/2013 | Altberg et al. |
| 8,521,596 B2 | 8/2013 | Altberg et al. |
| 8,538,768 B2 | 9/2013 | Agarwal et al. |
| 8,681,952 B2 | 3/2014 | Agarwal et al. |
| 8,700,461 B2 | 4/2014 | Wong et al. |
| 8,914,394 B1 | 12/2014 | Dubois et al. |
| 8,934,614 B2 | 1/2015 | Altberg et al. |
| 9,087,336 B2 | 7/2015 | Faber et al. |
| 9,118,778 B2 | 8/2015 | Altberg et al. |
| 9,183,559 B2 | 11/2015 | Altberg et al. |
| 9,202,217 B2 | 12/2015 | Altberg et al. |
| 9,208,495 B2 | 12/2015 | Altberg et al. |
| 9,208,496 B2 | 12/2015 | Altberg et al. |
| 9,208,497 B2 | 12/2015 | Ho et al. |
| 9,208,498 B2 | 12/2015 | Faber et al. |
| 2001/0010043 A1 | 7/2001 | Lauffer |
| 2001/0012913 A1 | 8/2001 | Iliff |
| 2001/0016826 A1 | 8/2001 | Lauffer |
| 2001/0018662 A1 | 8/2001 | Lauffer |
| 2001/0027481 A1 | 10/2001 | Whyel |
| 2001/0027559 A1 | 10/2001 | Tanabe et al. |
| 2001/0029322 A1 | 10/2001 | Iliff |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0048737 A1 | 12/2001 | Goldberg et al. |
| 2002/0003867 A1 | 1/2002 | Rothschild et al. |
| 2002/0010608 A1 | 1/2002 | Faber et al. |
| 2002/0010616 A1 | 1/2002 | Itzhaki |
| 2002/0026457 A1 | 2/2002 | Jensen |
| 2002/0029241 A1 | 3/2002 | Yokono et al. |
| 2002/0038233 A1 | 3/2002 | Shubov et al. |
| 2002/0044640 A1 | 4/2002 | Meek et al. |
| 2002/0049644 A1 | 4/2002 | Kargman |
| 2002/0057776 A1 | 5/2002 | Dyer |
| 2002/0065959 A1 | 5/2002 | Kim et al. |
| 2002/0075844 A1 | 6/2002 | Hagen |
| 2002/0077118 A1 | 6/2002 | Zellner et al. |
| 2002/0087353 A1 | 7/2002 | Han |
| 2002/0087411 A1 | 7/2002 | Rossides |
| 2002/0087565 A1 | 7/2002 | Hoekman et al. |
| 2002/0090203 A1 | 7/2002 | Mankovitz |
| 2002/0095331 A1 | 7/2002 | Osman et al. |
| 2002/0099605 A1 | 7/2002 | Weitzman et al. |
| 2002/0099606 A1 | 7/2002 | Shlagman |
| 2002/0107697 A1 | 8/2002 | Jensen |
| 2002/0107805 A1 | 8/2002 | Kamimura et al. |
| 2002/0112033 A1 | 8/2002 | Doemling et al. |
| 2002/0120554 A1 | 8/2002 | Vega |
| 2002/0122547 A1 | 9/2002 | Hinchey et al. |
| 2002/0133388 A1 | 9/2002 | Lauffer |
| 2002/0133402 A1 | 9/2002 | Faber et al. |
| 2002/0133446 A1 | 9/2002 | Lee |
| 2002/0133570 A1 | 9/2002 | Jacob et al. |
| 2002/0133571 A1 | 9/2002 | Jacob et al. |
| 2002/0136377 A1 | 9/2002 | Stewart et al. |
| 2002/0141404 A1 | 10/2002 | Wengrovitz |
| 2002/0156815 A1 | 10/2002 | Davia |
| 2002/0161646 A1 | 10/2002 | Gailey et al. |
| 2002/0164006 A1 | 11/2002 | Weiss |
| 2002/0164977 A1 | 11/2002 | Link, II et al. |
| 2002/0167919 A1 | 11/2002 | Marples et al. |
| 2002/0173319 A1 | 11/2002 | Fostick |
| 2002/0191762 A1 | 12/2002 | Benson |
| 2002/0193094 A1 | 12/2002 | Lawless et al. |
| 2003/0026397 A1 | 2/2003 | McCroskey |
| 2003/0036686 A1 | 2/2003 | Iliff |
| 2003/0043981 A1 | 3/2003 | Lurie et al. |
| 2003/0046161 A1 | 3/2003 | Kamangar et al. |
| 2003/0067933 A1 | 4/2003 | Huffschmid |
| 2003/0083042 A1 | 5/2003 | Abuhamdeh |
| 2003/0105824 A1 | 6/2003 | Brechner et al. |
| 2003/0135095 A1 | 7/2003 | Iliff |
| 2003/0135460 A1 | 7/2003 | Talegon |
| 2003/0138091 A1 | 7/2003 | Meek et al. |
| 2003/0153819 A1 | 8/2003 | Iliff |
| 2003/0163299 A1 | 8/2003 | Iliff |
| 2003/0195009 A1 | 10/2003 | Endo |
| 2003/0195787 A1 | 10/2003 | Brunk et al. |
| 2003/0212600 A1 | 11/2003 | Hood et al. |
| 2003/0220866 A1 | 11/2003 | Pisaris-Henderson et al. |
| 2003/0223563 A1 | 12/2003 | Wolmuth |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0008834 A1 | 1/2004 | Bookstaff |
| 2004/0010518 A1 | 1/2004 | Montemer |
| 2004/0023644 A1 | 2/2004 | Montemer |
| 2004/0042608 A1 | 3/2004 | Zey |
| 2004/0076403 A1 | 4/2004 | Mankovitz |
| 2004/0083133 A1 | 4/2004 | Nicholas et al. |
| 2004/0091093 A1 | 5/2004 | Bookstaff |
| 2004/0096110 A1 | 5/2004 | Yogeshwar et al. |
| 2004/0103024 A1 | 5/2004 | Patel et al. |
| 2004/0162757 A1 | 8/2004 | Pisaris-Henderson |
| 2004/0174965 A1 | 9/2004 | Brahm et al. |
| 2004/0174974 A1 | 9/2004 | Meek et al. |
| 2004/0193488 A1 | 9/2004 | Khoo et al. |
| 2004/0204997 A1 | 10/2004 | Blaser et al. |
| 2004/0234049 A1 | 11/2004 | Melideo |
| 2004/0234064 A1 | 11/2004 | Melideo |
| 2004/0235524 A1 | 11/2004 | Abuhamdeh |
| 2004/0236441 A1 | 11/2004 | Melideo |
| 2004/0247092 A1 | 12/2004 | Timmins et al. |
| 2004/0249649 A1 | 12/2004 | Stratton et al. |
| 2004/0249778 A1 | 12/2004 | Iliff |
| 2004/0249951 A1 | 12/2004 | Grabeisky |
| 2004/0254859 A1 | 12/2004 | Aslanian, Jr. |
| 2004/0258048 A1 | 12/2004 | Melideo |
| 2004/0260413 A1 | 12/2004 | Melideo |
| 2004/0260608 A1 | 12/2004 | Lewis et al. |
| 2005/0004846 A1 | 1/2005 | Dresden |
| 2005/0010795 A1 | 1/2005 | Tagawa et al. |
| 2005/0018829 A1 | 1/2005 | Baker |
| 2005/0018849 A1 | 1/2005 | Rodriguez et al. |
| 2005/0021744 A1 | 1/2005 | Haitsuka et al. |
| 2005/0038686 A1 | 2/2005 | Lauffer |
| 2005/0041647 A1 | 2/2005 | Stinnie |
| 2005/0044238 A1 | 2/2005 | Jacob et al. |
| 2005/0048961 A1 | 3/2005 | Ribaudo et al. |
| 2005/0065811 A1 | 3/2005 | Chu et al. |
| 2005/0074100 A1 | 4/2005 | Lederman |
| 2005/0074102 A1 | 4/2005 | Altberg et al. |
| 2005/0076100 A1 | 4/2005 | Armstrong |
| 2005/0080878 A1 | 4/2005 | Cunningham et al. |
| 2005/0086104 A1 | 4/2005 | McFadden |
| 2005/0096980 A1 | 5/2005 | Koningstein |
| 2005/0100153 A1 | 5/2005 | Pines et al. |
| 2005/0105881 A1 | 5/2005 | Mankovitz |
| 2005/0114208 A1 | 5/2005 | Arbuckle et al. |
| 2005/0114210 A1 | 5/2005 | Faber et al. |
| 2005/0125416 A1 | 6/2005 | Kirsch et al. |
| 2005/0135387 A1 | 6/2005 | Rychener et al. |
| 2005/0154616 A1 | 7/2005 | Iliff |
| 2005/0165285 A1 | 7/2005 | Iliff |
| 2005/0165666 A1 | 7/2005 | Wong et al. |
| 2005/0203799 A1 | 9/2005 | Faber et al. |
| 2005/0209874 A1 | 9/2005 | Rossini |
| 2005/0216341 A1 | 9/2005 | Agarwal et al. |
| 2005/0216345 A1 | 9/2005 | Altberg et al. |
| 2005/0216936 A1 | 9/2005 | Knudson et al. |
| 2005/0220289 A1 | 10/2005 | Reding |
| 2005/0222908 A1 | 10/2005 | Altberg et al. |
| 2005/0228780 A1 | 10/2005 | Diab et al. |
| 2005/0239447 A1 | 10/2005 | Holzman et al. |
| 2005/0240432 A1 | 10/2005 | Jensen |
| 2005/0245241 A1 | 11/2005 | Durand et al. |
| 2005/0251445 A1 | 11/2005 | Wong et al. |
| 2005/0261964 A1 | 11/2005 | Fang |

(56) References Cited

U.S. PATENT DOCUMENTS

| | | |
|---|---|---|
| 2005/0286688 A1 | 12/2005 | Scherer |
| 2005/0289015 A1 | 12/2005 | Hunter et al. |
| 2005/0289097 A1 | 12/2005 | Trossen et al. |
| 2006/0003735 A1 | 1/2006 | Trandal et al. |
| 2006/0004627 A1 | 1/2006 | Baluja |
| 2006/0031516 A1 | 2/2006 | Kumer |
| 2006/0034257 A1 | 2/2006 | Hollatz et al. |
| 2006/0069610 A1 | 3/2006 | Rossini |
| 2006/0074760 A1 | 4/2006 | Helin et al. |
| 2006/0075104 A1 | 4/2006 | Kumer |
| 2006/0078096 A1 | 4/2006 | Poyhonen et al. |
| 2006/0095343 A1 | 5/2006 | Clarke et al. |
| 2006/0099936 A1 | 5/2006 | Link, II et al. |
| 2006/0106711 A1 | 5/2006 | Melideo |
| 2006/0136310 A1 | 6/2006 | Gonen et al. |
| 2006/0149710 A1 | 7/2006 | Koningstein et al. |
| 2006/0159063 A1 | 7/2006 | Kumer |
| 2006/0165068 A1 | 7/2006 | Dalton et al. |
| 2006/0166655 A1 | 7/2006 | Montemer |
| 2006/0171520 A1 | 8/2006 | Kliger |
| 2006/0173827 A1 | 8/2006 | Kliger |
| 2006/0173915 A1 | 8/2006 | Kliger |
| 2006/0182250 A1 | 8/2006 | Melideo |
| 2006/0184417 A1 | 8/2006 | Van Der Linden et al. |
| 2006/0200380 A1 | 9/2006 | Ho et al. |
| 2006/0238379 A1 | 10/2006 | Kimchi et al. |
| 2006/0247999 A1 | 11/2006 | Gonen et al. |
| 2006/0259365 A1 | 11/2006 | Agarwal et al. |
| 2006/0277108 A1 | 12/2006 | Altberg et al. |
| 2006/0277181 A1 | 12/2006 | Temple et al. |
| 2007/0005585 A1 | 1/2007 | Feng et al. |
| 2007/0011240 A1 | 1/2007 | Altberg et al. |
| 2007/0022011 A1 | 1/2007 | Altberg et al. |
| 2007/0033102 A1 | 2/2007 | Frank et al. |
| 2007/0038507 A1 | 2/2007 | Kumer |
| 2007/0067219 A1 | 3/2007 | Altberg et al. |
| 2007/0071200 A1 | 3/2007 | Brouwer |
| 2007/0078717 A1 | 4/2007 | Ho et al. |
| 2007/0081662 A1 | 4/2007 | Altberg et al. |
| 2007/0083408 A1 | 4/2007 | Altberg et al. |
| 2007/0100956 A1 | 5/2007 | Kumer |
| 2007/0112656 A1 | 5/2007 | Howe et al. |
| 2007/0116217 A1 | 5/2007 | Altberg et al. |
| 2007/0121844 A1 | 5/2007 | Altberg et al. |
| 2007/0121845 A1 | 5/2007 | Altberg et al. |
| 2007/0121846 A1 | 5/2007 | Altberg et al. |
| 2007/0121847 A1 | 5/2007 | Faber et al. |
| 2007/0121848 A1 | 5/2007 | Faber et al. |
| 2007/0124206 A1 | 5/2007 | Faber et al. |
| 2007/0124207 A1 | 5/2007 | Faber et al. |
| 2007/0127650 A1 | 6/2007 | Altberg et al. |
| 2007/0129054 A1 | 6/2007 | Andronikov et al. |
| 2007/0130014 A1 | 6/2007 | Altberg et al. |
| 2007/0130338 A1 | 6/2007 | Malik et al. |
| 2007/0136295 A1 | 6/2007 | Gorodyansky et al. |
| 2007/0140451 A1 | 6/2007 | Altberg et al. |
| 2007/0143182 A1 | 6/2007 | Faber et al. |
| 2007/0162296 A1 | 7/2007 | Altberg et al. |
| 2007/0165821 A1 | 7/2007 | Altberg et al. |
| 2007/0174124 A1 | 7/2007 | Zagofsky et al. |
| 2007/0177578 A1 | 8/2007 | Anspach et al. |
| 2007/0189473 A1 | 8/2007 | Altberg et al. |
| 2007/0202881 A1 | 8/2007 | Dervan |
| 2007/0206506 A1 | 9/2007 | Purpura |
| 2007/0230374 A1 | 10/2007 | Altberg et al. |
| 2007/0230671 A1 | 10/2007 | Altberg et al. |
| 2007/0230679 A1 | 10/2007 | Altberg et al. |
| 2007/0242626 A1 | 10/2007 | Altberg et al. |
| 2007/0250562 A1 | 10/2007 | Kumer |
| 2007/0269038 A1 | 11/2007 | Gonen et al. |
| 2007/0274484 A1 | 11/2007 | Frank et al. |
| 2007/0280443 A1 | 12/2007 | Jacob et al. |
| 2007/0283006 A1 | 12/2007 | Hong |
| 2008/0005268 A1 | 1/2008 | Chen |
| 2008/0008306 A1 | 1/2008 | Kliger |
| 2008/0071554 A1 | 3/2008 | Miles et al. |
| 2008/0080442 A1 | 4/2008 | Moon et al. |
| 2008/0091536 A1 | 4/2008 | Wolmuth |
| 2008/0097845 A1 | 4/2008 | Altberg et al. |
| 2008/0107102 A1 | 5/2008 | Kaufman et al. |
| 2008/0126209 A1 | 5/2008 | Wong et al. |
| 2008/0144604 A1 | 6/2008 | Sharma et al. |
| 2008/0175174 A1 | 7/2008 | Altberg et al. |
| 2008/0187114 A1 | 8/2008 | Altberg et al. |
| 2008/0189768 A1 | 8/2008 | Callahan et al. |
| 2008/0207190 A1 | 8/2008 | Altberg et al. |
| 2008/0262910 A1 | 10/2008 | Altberg et al. |
| 2008/0262911 A1 | 10/2008 | Altberg et al. |
| 2008/0275785 A1 | 11/2008 | Altberg et al. |
| 2008/0310604 A1 | 12/2008 | Agarwal et al. |
| 2008/0313039 A1 | 12/2008 | Altberg et al. |
| 2009/0030755 A1 | 1/2009 | Altberg et al. |
| 2009/0060148 A1 | 3/2009 | Jacob |
| 2009/0067599 A1 | 3/2009 | Agarwal et al. |
| 2009/0113312 A1 | 4/2009 | Schoenberg |
| 2009/0138317 A1 | 5/2009 | Schoenberg |
| 2009/0316687 A1 | 12/2009 | Kruppa |
| 2009/0323670 A1 | 12/2009 | Altberg et al. |
| 2010/0144380 A1 | 6/2010 | Washburn |
| 2010/0191657 A1 | 7/2010 | Melideo |
| 2010/0226261 A1 | 9/2010 | Piche |
| 2011/0264517 A1 | 10/2011 | Ho et al. |
| 2013/0103503 A1 | 4/2013 | Zhang et al. |
| 2013/0262240 A1 | 10/2013 | Altberg et al. |
| 2013/0311261 A1 | 11/2013 | Faber et al. |
| 2013/0325635 A1 | 12/2013 | Altberg et al. |
| 2013/0336471 A1 | 12/2013 | Agarwal et al. |
| 2014/0207588 A1 | 7/2014 | Wong et al. |
| 2015/0379560 A1 | 12/2015 | Faber et al. |
| 2016/0012476 A1 | 1/2016 | Altberg et al. |
| 2016/0042406 A1 | 2/2016 | Altberg et al. |
| 2016/0050187 A1 | 2/2016 | Altberg et al. |

FOREIGN PATENT DOCUMENTS

| | | |
|---|---|---|
| CA | 2475965 A1 | 4/2005 |
| CA | 2504623 A1 | 9/2005 |
| CA | 2506360 A1 | 10/2005 |
| CA | 2504629 A1 | 11/2005 |
| CA | 2566312 A1 | 11/2005 |
| CA | 2599184 A1 | 8/2006 |
| CA | 2599371 A1 | 8/2006 |
| CA | 2624389 A1 | 4/2007 |
| CA | 2685678 A1 | 11/2008 |
| CA | 2690837 A1 | 1/2010 |
| CN | 1836438 A | 9/2006 |
| CN | 1839405 A | 9/2006 |
| CN | 1998018 A | 7/2007 |
| CN | 101124557 A | 2/2008 |
| CN | 101258474 A | 9/2008 |
| EP | 1522944 A1 | 4/2005 |
| EP | 1636751 A2 | 3/2006 |
| EP | 1646979 A2 | 4/2006 |
| EP | 1665156 A2 | 6/2006 |
| EP | 1754187 A2 | 2/2007 |
| EP | 1759344 A2 | 3/2007 |
| EP | 1851679 A2 | 11/2007 |
| EP | 1880340 A2 | 1/2008 |
| EP | 1938566 A2 | 7/2008 |
| EP | 1977385 A2 | 10/2008 |
| EP | 1977590 A2 | 10/2008 |
| EP | 2153399 A1 | 2/2010 |
| EP | 2201521 A2 | 6/2010 |
| GB | 2329046 | 3/1999 |
| GB | 2407229 A | 4/2005 |
| GB | 2424973 A | 10/2006 |
| GB | 2425375 A | 10/2006 |
| GB | 2430767 A | 4/2007 |
| JP | 09233441 | 9/1997 |
| JP | 09319812 | 12/1997 |
| JP | 2002278858 | 9/2002 |
| JP | 2003337896 | 11/2003 |
| JP | 2005115945 A | 4/2005 |
| JP | 2005141583 | 6/2005 |

(56) References Cited

FOREIGN PATENT DOCUMENTS

| | | |
|---|---|---|
| KR | 20010086595 | 9/2001 |
| KR | 20030043827 | 6/2003 |
| WO | WO 1997/005733 | 2/1997 |
| WO | WO 1998/002835 | 1/1998 |
| WO | WO 1998/004061 | 1/1998 |
| WO | WO 1998/013765 | 4/1998 |
| WO | WO 1998/038558 | 9/1998 |
| WO | WO 1998/047295 | 10/1998 |
| WO | WO 1999/055066 | 10/1999 |
| WO | WO 1999/057643 | 11/1999 |
| WO | WO 2000/057326 | 9/2000 |
| WO | WO 2001/027825 | 4/2001 |
| WO | WO 2001/028141 | 4/2001 |
| WO | WO 2002/044870 | 6/2002 |
| WO | WO 2002/088880 | 11/2002 |
| WO | WO 2003/102738 | 12/2003 |
| WO | WO 2005/040962 | 5/2005 |
| WO | WO 2005/086980 | 9/2005 |
| WO | WO 2005/101269 | 10/2005 |
| WO | WO 2005/109287 A2 | 11/2005 |
| WO | WO 2005/109288 | 11/2005 |
| WO | WO 2005/111887 | 11/2005 |
| WO | WO 2005/111893 | 11/2005 |
| WO | WO 2006/091966 | 8/2006 |
| WO | WO 2006/091970 | 8/2006 |
| WO | WO 2007/028173 | 3/2007 |
| WO | WO 2007/038618 | 4/2007 |
| WO | WO 2007/086991 A2 | 8/2007 |
| WO | WO 2007/086992 A2 | 8/2007 |
| WO | WO 2008/005779 A2 | 1/2008 |
| WO | WO 2008/033953 A2 | 3/2008 |
| WO | WO 2008/040010 A2 | 4/2008 |
| WO | WO 2008/040013 A2 | 4/2008 |
| WO | WO 2008/052083 A1 | 5/2008 |
| WO | WO 2008/058295 A1 | 5/2008 |
| WO | WO 2008/070327 A2 | 6/2008 |
| WO | WO 2008/134207 A1 | 11/2008 |
| WO | WO 2010/005420 A2 | 1/2010 |

OTHER PUBLICATIONS

U.S. Appl. No. 60/560,926, "Method and apparatus to track demand partners in a pay-per-call performance based advertising system," Unpublished (filed Apr. 9, 2004), (Scott Faber, Inventor).
United States Patent and Trademark Office, Office Action for U.S. Appl. No. 11/565,554, dated Nov. 25, 2016, 42 pages, USA.
United States Patent and Trademark Office, Office Action for U.S. Appl. No. 11/565,554, dated Jun. 23, 2016, 10 pages, USA.
"Applying Technology News," Accounting Technology, p. 14 (Feb./Mar. 1997).
"At Once Talks Up E-mail Marketing Campaigns with ITXC Push to Talk Service," Business Wire, Feb. 26, 2001.
"Connecting to On-Line Car Shoppers: Auto Sellers Use Netcall Internet Call-Button Technology to Turn Clicks into Interactive Sales", Business Wire, p. 4089, Jul. 1999.
"DHTML for the World Wide Web". Jason Cranford Teague. 1998. Peachpit Press pp. 150 and 151.
Wieland, Heidi, et al., "Expertcity.com Launches Premier Online Marketplace for Expert Services," PR Newswire, Aug. 30, 1999.
Krantz, Peter, "Proposal for an Accessible Captcha", located at http://www.standards-schmandards.com/2005/captcha, Jan. 1, 2005.
"Introducing 1-800-FREE411: First Nationwide Free Telephone Directory Assistance Service" Jingle Networks, Inc., Huntington Beach, Calif., Sep. 20, 2005.
"ITXC Corp and Doubleclick Energize Banner Ads with Web Telephony; Companies Voice-Enable Banner Advertisements Using ITXC Push to Talk Service," Business Wire, Dec. 12, 2000.
"Keen.com.TM. Launches First Live Answer Community.TM., Connects People with Information to Share Over Their Standard Telephone", Press Release [retrieved from http://keen.com] (Oct. 24, 2000), published Nov. 8, 1999.
Broad, Doug, et al., "Lucent Technology and Netscape Team to Deliver Lucent Ecommerce Solutions," Business Wire, Sep. 23, 1998.
"Netcall Internet Call Buttons Enhance E-Commerce Customer Service and Sales", PR Newswire, p. 7431, Aug. 1999.
Angelo, Simon, "Surfbrains.com: Brains online save time & money", M2 Presswire, Jul. 11, 2000.
"TriNet's, Help Me, I'm Stuck, Internet Voice Button Services Pushes Web Pages to Online Users." Business Wire, Mar. 1998.
Moore, Michael, et al., "USA Global Link Brings Interactivity to Internet Shopping," Business Wire, Oct. 1998.
Ek, Brian, "Walker Digital Issued Landmark U.S. Pat. No. 5,862,223 for Global Internet Marketplace for Experts", Business Wire, Jan. 26, 1999.
"Welcome to Jambo—the leader in Pay-per-Call Solutions" (search results) Oct. 17, 2005.
Abhaya Asthma and Paul Krzyzanowski, "A Small Domain Communications System for Personalized Shopping Assistance," Proceedings of ICPWC'94, Publication No. 0-7803-1996-6/94, IEEE, 1994, pp. 199-203.
Ads-Click, "Ads-click Adds Skype-Based Pay-Per-Call Advertising Capabilities to Its Private-Labeled Solution, Which Will Be Unveiled at ad:tech New York," Market Wire, Oct. 10, 2005.
America Online Launches New Yellow pages 'Bot' to Make American Online Yellow Pages more convenient and accessible than ever. Jun. 26, 2003. Business Wire.
Amir Herzberg, et al., "MiniPay: Charging Per Click on the Web," Computer Networks and ISDN Systems 29, (Sep. 1997) vol. 29, pp. 939-951.
Answers.com Web Page (www.answers.com), available at least by Aug. 8, 2000.
Drescher, Bob, et al., Aspect Telecomm: Aspect Integrates the Web into the Call Center to Deliver New Level of Customer Service, M2 Presswire, Aug. 1996.
Barbara Jarvie, "Company Devoted to Hot-Line Support", Computer Reseller News, Oct. 21, 1991, p. 48.
Bazini, Liz, "UpSnap Selects LookSmart to Sell Premium Listings on Free 411 Service for Text-Enabled Cell Phones," Nov. 4, 2004.
Brian Quinton, "Pay-per-Call Picks Up Speed", Oct. 1, 2005.
Chris Ott, "Making Good on the Information Economy". Denver Business Journal, Dec. 17, 1999, p. 27.
Sean Bolton, "Pay-Per-Call Frenzy", Sep. 14, 2005.
Christina Wood, "Hidden Cost of Tech Support", PC World, May 1995, pp. 143-152 & p. 156.
Clark, Don, "Keen.com Plans Web Service Allowing Customers to Hold Private Phone Chats," Wall Street Journal, Nov. 8, 1999.
Collett, Stacey & Julie King, "Why Online Browsers Don't Become Buyers," Computerworld, vol. 33, No. 48, p. 14 (Nov. 1999).
Cynthia Hodgson, "Online Expert Databases & Services", Econtent, Dec. 1999, p. 48-53.
Davey, Tom, "Wheeling and Dealing Online", PC Week, vol. 13, No. 45, pp. 1, 129., Nov. 1996.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
Edith Herman, "US Courts to Launch First Federal 900 Service," Federal Computer Week, Sep. 28, 1992, p. 8.
Ellen Greenblatt, "Have you ever wondered . . . ", Datamation, Oct. 1997, p. 12.
EP Application No. 05745704.6, Examination Report, dated Feb. 1, 2010.
European Patent Office, Extended European Search Report for Application No. 08876555.7, dated Apr. 23, 2012, 5 pages, Germany.
EXP.com Web Site at www.exp.com, avaliable at least by Sep. 20, 2000.
CCBN, Inc. "Full Year 2003 and Q4 Ebookers PLC Earnings Conference Call—Part 2," Fair Disclosure Wire, Mar. 22, 2004.
Ellis, James E., for Telesphere's Clients, Dial '1-900-Tuf Luck', Business Week, Sep. 9, 1991, 88.

(56) References Cited

OTHER PUBLICATIONS

Franco Mercalli, et al., "The ESSAI Teleshopping System: An Example of Broadband Multimedia Application," Publication No. 0-7803-1820-X/94, IEEE, pp. 572-576 (1994).
Greenberg, Ken, "Jambo Launches to Connect People and Businesses from the Internet to the Phone," Market Wire, May 3, 2005.
Greenberg, Ken, "Jambo Names Netzero Co-founder Stacy Haitsuka to New Post of Chief Information Officer," Business Wire, Jul. 5, 2005.
Greenberg, Ken, "Jambo Receives $5 Million in Financing from Kline Hawkes & Co., Westlake Venture Partners, Others," Business Wire, Oct. 17, 2005.
Gregory Dalton, "Rent-An-Expert on the Web," Information Week p. 75 (Sep. 6, 1999).
Healey, Jon, "From A to Z, You Can Sell Advice Online." Retrieved from http://www.mercurycenter.com on Oct. 24, 2000, published on Nov. 7, 1999.
Infomarkets.com Web Site (www.infomarkets.com) retrieved on Aug. 8, 2000.
Information about Expertcity.com retrieved from the Internet [http://www.expertcity.com] on Nov. 6, 2000.
The Internet Society, "Early Media and Ring Tone Generation in the Session Initiation Protocol (SIP)." Network Working Group, RFC 3960, Dec. 2004.
Information about Keen.com retrieved from the Internet [URL:http://www.keen.com] on Oct. 24, 2000, disclosure dates back to 1999.
Dyson, Esther, "Information, Bid and Asked", Forbes, Aug. 20, 1990, 92.
Ingenio, Inc., "FindWhat.com Enters Agreement with Ingenio to Offer Pay Per Call Advertising Platform," press release available at http://www.ingenio.com, Apr. 7, 2004.
Ingenio, Inc., "Keen: Your Personal Advisor," retrieved from http://www.keen.com, available at least by Feb. 4, 2006.
Ingenio, Inc., Press Archives for 2004, retrieved from http://www.ingenio.com on Feb. 21, 2006.
Intellect Exchange Web Site (www.intellectexchange.com) available at least by Aug. 8, 2000.
International Application No. PCT/US04/15238, Written Opinion and International Search Report, dated Aug. 29, 2005.
International Application No. PCT/US05/08379, Written Opinion and International Search Report, dated Nov. 17, 2006.
International Application No. PCT/US05/15631, Written Opinion and International Search Report, dated Feb. 22, 2007.
International Application No. PCT/US05/15646, Written Opinion and International Search Report, dated Jan. 29, 2007.
International Application No. PCT/US07/82445, Written Opinion and International Search Report, dated May 23, 2008.
International Application No. PCT/US2008/059687, Written Opinion and International Search Report, dated Aug. 25, 2008.
ISA/US, International Search Report and Written Opinion for International Application No. PCT/US05/12061, 6 pages, dated Nov. 17, 2006.
Becker, Ralph, "ISDN Tutorial: Definitions," http://www.ralphb.net/ISDN/defs.html (Apr. 21, 2000).
Becker, Ralph, "ISDN Tutorial: Interfaces", http://www.ralphb.net/ISDN/ifaces.html Apr. 21, 2000.
J. Sairamesh, et al., "NetBazaar: Networked Electronic Markets for Trading Computation and Information Services", Research and Advanced Technology for Digital Libraries, Second European Conference, ECDL 1998, pp. 839-856 (Sep. 21-23, 1998).
J.W.R. Griffiths, et al., "Multimedia Communication in a Medical Environment", IEEE 1991 Singapore I.C. on Networks, p. 166 (8 pgs.).
Jeff Pelline, "Net Firm to Connect Users by Phone," CNET News.com [retrieved from http://new.cnet.com] (Oct. 24, 2001) published Nov. 8, 1999.
Jingle Networks, Inc., "1-800-FREE411 Provides Two Great Opportunities to Acquire New Customers," available at least by Oct. 20, 2005.
Joann M. Wasik, "Information for Sale: Commercial Digital Reference and AskA Service", Virtual Reference Desk, Sep. 20, 1999, at www.vrd.org/AskA/commAskA.html.
John Robinson, "Attachmate Ready to Answer Net Questions", Network World, Apr. 8, 1996, p. 37.
Joseph Menn, "An Expert? There's Now a Home for You on the Internet", Los Angeles Times (retrieved from http://denverpost.com on Oct. 24, 2001).
Keen.com Feb. 4, 2006.
Keen.com raises $60 Million from Prestigious Investors and Strategic Partners Just 60 Days After Launch of Its Live Answer Community, Business Wire, Jan. 11, 2000.
*Keen.com, Inc.* v. *InfoRocket.com, Inc.*, Complaint for Patent Infringement, Trade Dress Infringement and Unfair Competition; Demand for Jury Trial filed Aug. 31, 2001, pp. 1-8.
*Keen.com, Inc.* v. *InfoRocket.com, Inc.*, Preliminary Injunction Hearing, pp. 286-289 (Jan. 8, 2002).
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.
L. F. Ludwig and D. F. Dunn, "Laboratory for Emulation and Study of Integrated and Coordinated Media Communication," Conference on Office Communication Systems, Mar. 23-25, 1988, Sponsored by ACM SIGOIS and IEEECS TC-OA in cooperation with IFIP W.G. 8.4, pp. 283-291.
Linda Littleton, "Meet the Shadowy Future, HDD: A Helpdesk Database," Proceedings of ACM SIGUCCS User Services Conference XXII Ypsilanti, Michigan Oct. 16-19, 1994, pp. 205-210.
Mary Wagner, "Caring for Customer. (Internet/Web/Online Information)—Real-time text chat and telephony provide personalized customer support and turn queries into sales leads," Internet World, Sep. 1, 1999, (3 pgs.).
Masahiko Hase, Shuji Kawakubo and Mineo Shoman, "Advanced Videophone System Using Synchronized Video Filing Equipment," NTT Review, vol. 3, No. 4 Jul. 1991, pp. 29-36.
Michael Kanellos, "Do You Want to Know the Meaning of Life?", Computer Reseller News, Mar. 3, 1997, pp. 72-74.
Michael Rogers, et al., "Experts Abound at New Web Sites", Library Journal, Mar. 1, 2000, pp. 22-24.
Patricia Hursh, "Search Advertising that Makes the Phone Ring", Search Engine Watch, Apr. 19, 2005.
PCT Search Report for PCT Application No. PCT/US01/48284, filed Oct. 30, 2001 (corresponding to U.S. Appl. No. 09/702,217) dated May 13, 2002 (7 pgs.).
Peggy Anne Salz, "Pay-Per-Call Mobile Search Model Gains Traction as 'Last Mile' to Mobile Content", Dec. 11, 2006.
Provisional application to Stinnie U.S. Appl. No. 60/492,285, filed Aug. 5, 2003.
Qcircuit Web Site (www.qcircuit.com) available at least by Aug. 8, 2000.
Richard A. Kuehn, "The Voice of Technology," Credit World, pp. 20-23 (Jul. 1994).
"Sell and buy advice online", The Ottawa Citizen, p. D7, Nov. 29, 1999.
Should your yellow pages ad go online? Meyers, Harriet. Aug. 1998. Journal code: RNO. v141 n8. pp. 36-38.
Sterling, Greg, "Ingenio's Ether—Pay Per Professional Advice," Search Engine Journal, Mar. 3, 2006.
Tehrani, Rich, "e-Rip Van Winkle and the 60 Second Nap," Call Center Solution, vol. 18, No. 2, pp. 16(3)., Aug. 1999.
Telecommunications Buyers Guide and Directory, Editor & Publisher, pp. 29TC-38TC, Feb. 1994.
Experts Exchange, Inc., The Web Site at www.experts-exchange.com, available at least by Apr. 9, 2000.
The web-site at www.allexperts.com, available at least by Apr. 9, 2000.
U.S. Appl. No. 09/596,466, filed Jun. 19, 2000, Reding, Craig.
U.S. Appl. No. 60/198,642, filed Apr. 20, 2000, Rothschild, et al.
U.S. Appl. No. 60/471,535, filed May 19, 2003, Melideo.
USPTO Transaction History of U.S. Appl. No. 10/679,982, filed Oct. 6, 2003, entitled "Method and Apparatus to Provide Pay-Per-Call Performance Based Advertising," now U.S. Pat. No. 7,120,235.

(56) References Cited

OTHER PUBLICATIONS

USPTO Transaction History of U.S. Appl. No. 10/956,571, filed Oct. 1, 2004, entitled "Method and System to Connect Consumers to Information."
USPTO Transaction History of U.S. Appl. No. 10/956,771, filed Oct. 1, 2004, entitled "Method and System to Connect Consumers to Information," now U.S. Pat. No. 7,224,781.
USPTO Transaction History of U.S. Appl. No. 11/021,939, filed Dec. 23, 2004, entitled "Method and Apparatus to Compensate Demand Partners in a Pay-Per-Call Performance Based Advertising System."
USPTO Transaction History of U.S. Appl. No. 11/092,309, filed Mar. 28, 2005, entitled "Methods and Apparatuses for Offline Selection of Pay-Per-Call Advertisers," now U.S. Pat. No. 7,366,683.
USPTO Transaction History of U.S. Appl. No. 11/508,015, filed Aug. 21, 2006, entitled "Method and Apparatus to Provide Pay-Per-Call Performance Based Advertising."
USPTO Transaction History of U.S. Appl. No. 11/559,866, filed Nov. 14, 2006, entitled "Method and Apparatuses to Track Keywords for Establish Communication Links."
USPTO Transaction History of U.S. Appl. No. 11/565,546, filed Nov. 30, 2006, entitled "Method and Apparatuses to Select Communication Tracking Mechanisms."
USPTO Transaction History of U.S. Appl. No. 11/624,613, filed Jan. 18, 2007, entitled "Method and Apparatuses for Pay for Deal Advertisements."
USPTO Transaction History of U.S. Appl. No. 11/624,641, filed Jan. 18, 2007, entitled "Systems and Methods to Block Communication Calls."
USPTO Transaction History of U.S. Appl. No. 11/678,012, filed Feb. 22, 2007, entitled Systems and Methods to Confirm Initiation of a Callback.
USPTO Transaction History of U.S. Appl. No. 11/691,372, filed Mar. 26, 2007, entitled "Methods and Systems to Connect Consumers to Information."
USPTO Transaction History of U.S. Appl. No. 11/697,932, filed Apr. 9, 2007, entitled "Methods and Systems to Provide Connections via Callback Acceptance."
USPTO Transaction History of U.S. Appl. No. 11/752,267, filed May 22, 2007, entitled "Method and Apparatuses to Connect People for Real Time Communications Via Voice Over Internet Protocol (VoIP)."
USPTO Transaction History of U.S. Appl. No. 11/761,800, filed Jun. 12, 2007, entitled "Method and Apparatuses to Track Information Using Call Signaling Messages."
USPTO Transaction History of U.S. Appl. No. 11/761,932, filed Jun. 12, 2007, entitled "Method and Apparatuses to Track Information Via Passing Information During Telephonic Call Process."
USPTO Transaction History of U.S. Appl. No. 11/761,987, filed Jun. 12, 2007, entitled "Method and Apparatuses to Track Information Via Telephonic Apparatuses."
USPTO Transaction History of U.S. Appl. No. 11/862,111, filed Sep. 26, 2007, entitled "Systems and Methods to Facilitate the Specification of a Complex Geographic Area."
USPTO Transaction History of U.S. Appl. No. 12/062,425, filed Apr. 3, 2008, entitled "Methods and Apparatuses for Offline Selection of Pay-Per-Call Advertisers."
USPTO Transaction History of U.S. Appl. No. 12/240,807, filed Sep. 29, 2008, entitled "Methods and Systems to Connect Consumers to Information."
USPTO Transaction History of U.S. Appl. No. 12/114,603, filed May 2, 2008, entitled "Systems and Methods to Facilitate Searches of Communication References."
Verizon transforms local search with Launch of New SuperPages. com Web site. Mar. 1, 2004. Newswire.
University of Texas—Austin, Welcome to the Electronic Emissary Project's WebCenter at www.tapr.org/emmisary/, available at least by Apr. 9, 2000.
De Lasser, Eleena, When Business Plan and Real World Clash, Wall Street Journal, Jun. 9, 1999, p. B1.
William H. Chimiak, et al, "Multimedia Collaborative Remote Consultation Tools Via Gigabit WAN in Teleradiology", IEEE 1994, Phoenix, p. 417 (7 pgs.).
United States Patent and Trademark Office, Notice of Allowance and Fee(s) Due for U.S. Appl. No. 11/778,878, dated Dec. 11, 2015, 12 pages, USA.
United States Patent and Trademark Office, Office Action for U.S. Appl. No. 11/778,878, dated Dec. 17, 2014, 22 pages, USA.
United States Patent and Trademark Office, Office Action for U.S. Appl. No. 11/565,554, dated Jan. 6, 2016, 10 pages, USA.
United States Patent and Trademark Office, Office Action for U.S. Appl. No. 11/565,554, dated Dec. 5, 2014, 13 pages, USA.
United States Patent and Trademark Office, Office Action for U.S. Appl. No. 11/565,554, dated May 27, 2014, 8 pages, USA.
United States Patent and Trademark Office, Office Action for U.S. Appl. No. 11/778,878, dated Jul. 28, 2014, 15 pages, USA.
United States Patent and Trademark Office, Office Action for U.S. Appl. No. 11/565,554, dated Jan. 31, 2011, 13 pages, USA.
United States Patent and Trademark Office, Office Action for U.S. Appl. No. 11/565,554, dated Sep. 16, 2010, 27 pages, USA.
United States Patent and Trademark Office, Office Action for U.S. Appl. No. 11/778,878, dated Mar. 22, 2012, 14 pages, USA.
United States Patent and Trademark Office, Office Action for U.S. Appl. No. 11/778,878, dated Aug. 24, 2011, 14 pages, USA.
Canadian Intellectual Property Office, Notice of Allowance for Application No. 2,690,837, dated Nov. 19, 2014, 1 page, Canada.
Canadian Intellectual Property Office, Requisition by the Examiner for Application No. 2,690,837, dated Jan. 9, 2012, 2 page, Canada.
Canadian Intellectual Property Office, Notice of Allowance for Application No. 2,690,837, dated Dec. 17, 2013, 4 page, Canada.
European Patent Office, Communication pursuant to Article 94(3) EPC for Application No. 08876555.7, dated Feb. 1, 2013, 6 pages.

SYSTEMS AND METHODS TO PROVIDE VOICE CONNECTIONS VIA LOCAL TELEPHONE NUMBERS

CROSS-REFERENCE TO RELATED APPLICATIONS

The present application is a continuation of U.S. patent application Ser. No. 11/778,878, filed Jul. 17, 2007, which claims priority from U.S. Provisional Patent Application No. 60/944,751, filed on Jun. 18, 2007, the contents of both of which are herein incorporated in their entireties by reference.

TECHNOLOGY FIELD

At least some embodiments disclosed relate to telephonic connections and advertising in general and performance-based advertising in particular.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

SUMMARY

Methods and apparatuses to dynamically allocate location dependent telephone numbers to facilitate voice connections between people are described here. Some embodiments are summarized in this section.

In one embodiment, a method includes: responsive to a request from a user, selecting a telephone number from a plurality of telephone numbers of a connection server to match a location indicator of the request; embedding the telephone number in an advertisement, the telephone number to be used by the user to initiate a telephone call to the connection server for further connection to an advertiser of the advertisement; and providing the advertisement with the telephone number of the connection server as a response to the request.

In one embodiment, responsive to receiving the telephone call at the telephone number of the connection server from the user, whether to play a prompt message to the user is determined based at least in part on statistic data about telephone calls collected at the connection server, an average speed of making calls by the user during a period of time, whether a valid telephone number of the user can be determined via an automatic number identification (ANI) service, a preference received from the user prior to the telephone call, and/or whether a location of the user as determined for the telephone call is outside the geographic area represented by the telephone number, etc.

The present disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows.

BRIEF DESCRIPTION OF THE DRAWINGS

The present disclosure is illustrated by way of example and not limitation in the figures of the accompanying drawings in which like references indicate similar elements.

DETAILED DESCRIPTION

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

Figure 1:
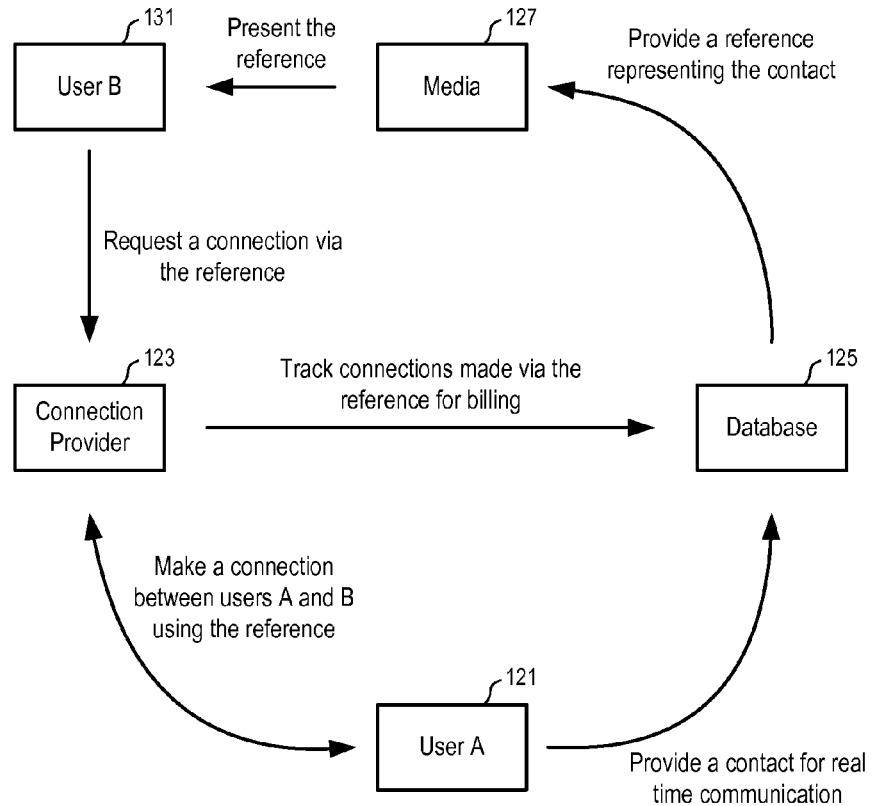
FIG. 1 shows a method to establish connections for real time communications according to one embodiment.

FIG. 1 shows a method to establish connections for real time communications according to one embodiment. In FIG. 1, user A (121) provides a contact for real time communication, such as a telephone reference of the user A. The contact can be used to establish a connection with user A (121) through a communication network. For example, the contact can be a telephone number of a landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (121) is stored in the database (125); and a reference is assigned to represent the contact. Instead of providing the contact to customers, the reference representing the contact is provided through the media (127) to user B (131). Thus, when the user B (131) uses the reference to request a connection with the user A (121), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference can be presented via a variety of media channels, such as a virtual reality environment, newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 1, the user B (131) can use the reference obtained from media (127) to request the connection provider (123) to establish a connection or facilitate a communication channel for real time communications between the user A (121) and the user B (131). The connection provider uses the database (125) to determine the contact of the user A (121) and then make a connection between the user A (121) and user B (131) using the contact of the user A (121). Alternatively, the reference may include an encoded/encrypted version of the contact of the user A (121) which can be decoded/decrypted without relying upon the database (125).

In response to the user B's request for a connection, the connection provider (123) may establish two separate connections to the user A (121) and the user B (131) and then bridge the two connections to connect the user A (121) and user B (131). For example, the connection provider (123) may determine the reference from a connection established between the user B (131) and connection provider (123) and then further bridge the connection to the user A (121).

In one embodiment, the connection provider (123) may provide a separate reference to represent the user B (131) and allow the user A (121) to subsequently callback to the user B (131) via the reference that represents the user B (131), if the user A (121) is not currently available for real time communications. The connection provider (123) may schedule an appointment for the user A (121) and user B (131) for a real time communication session. The connection provider (123) may send a notification to the user A (121) to inform the user A (121) about the request for a real time communication.

In one embodiment, the connection provider (123) tracks the connections made via the reference for billing for the advertisement. For example, the connection provider (123) may charge the advertiser for each communication lead deliver to the user A (121).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

Figure 2:
FIG. 2 illustrates a user interface for the creation of an advertisement according to one embodiment.

FIG. 2 illustrates a user interface for the creation of an advertisement according to one embodiment. The user interface may be presented via web in a web browser.

In FIG. 2, an interface (141) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (141) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 2, the interface (141) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording are stored in the database for a period of time and deleted if not used after a predetermined period of time, or when the usage of the audio advertisement is lower than a threshold.

Figure 3:
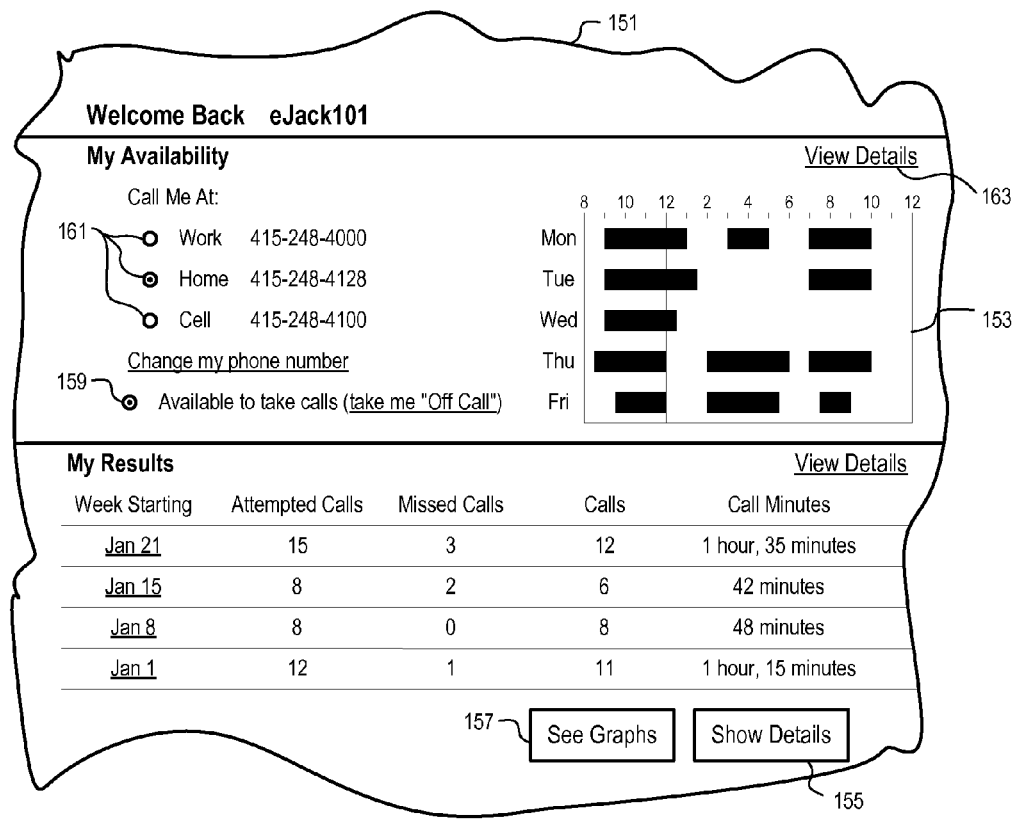
FIG. 3 illustrates an example of a user interface to manage availability for receiving phone calls according to one embodiment.

FIG. 3 illustrates an example of a user interface to manage availability for receiving phone calls according to one embodiment. An advertiser may specify the day and time of availability for accepting the calls for real time communications. Based on the availability, the system may schedule the presentation of the advertisements/communication references more effectively and block unwanted calls.

In one embodiment, the system can store multiple phone numbers of the seller. The system can intelligent route a call to the seller according to the preference of the seller. For example, in FIG. 3, the advertiser/seller may choose a preferred phone number from a set of phone numbers of the seller to receive incoming calls using the option group (161) in the user interface (151). The seller may indicate whether the seller is currently available to take calls or is to be taken "off call" (e.g., using the check box (159)).

In one embodiment, the system allows the seller to specify the schedule to receive calls; and the schedule (153) is displayed to the seller in a graphical way to help the seller to manage calls. In FIG. 3, the user interface (151) includes a link (163) which can be selected to display a user interface (not shown in FIG. 3) to manage the schedule (153).

In one embodiment, when the schedule or the check button (159) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 3, the user interface (151) also includes a summary of call activities. Buttons (157 and 155) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

In one embodiment, different types of communication references can be dynamically selected for advertisements to represent the contact information of the corresponding advertisers. A communication reference used to represent the contact of an advertiser may be a traditional phone number with or without an extension, a click-to-call reference, a SIP address for VoIP call, a click-to-reveal reference, etc. The communication reference can be embedded into an advertisement to count the communication leads generated from advertisements, to track the contributions of demand partners who operate media channels to present the advertisements to customers, and/or to track other aspects of advertising, such as partners who bring the advertisers/sellers to the system and the keywords responsible for the selection of the advertisement for presentation.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

Figure 4:
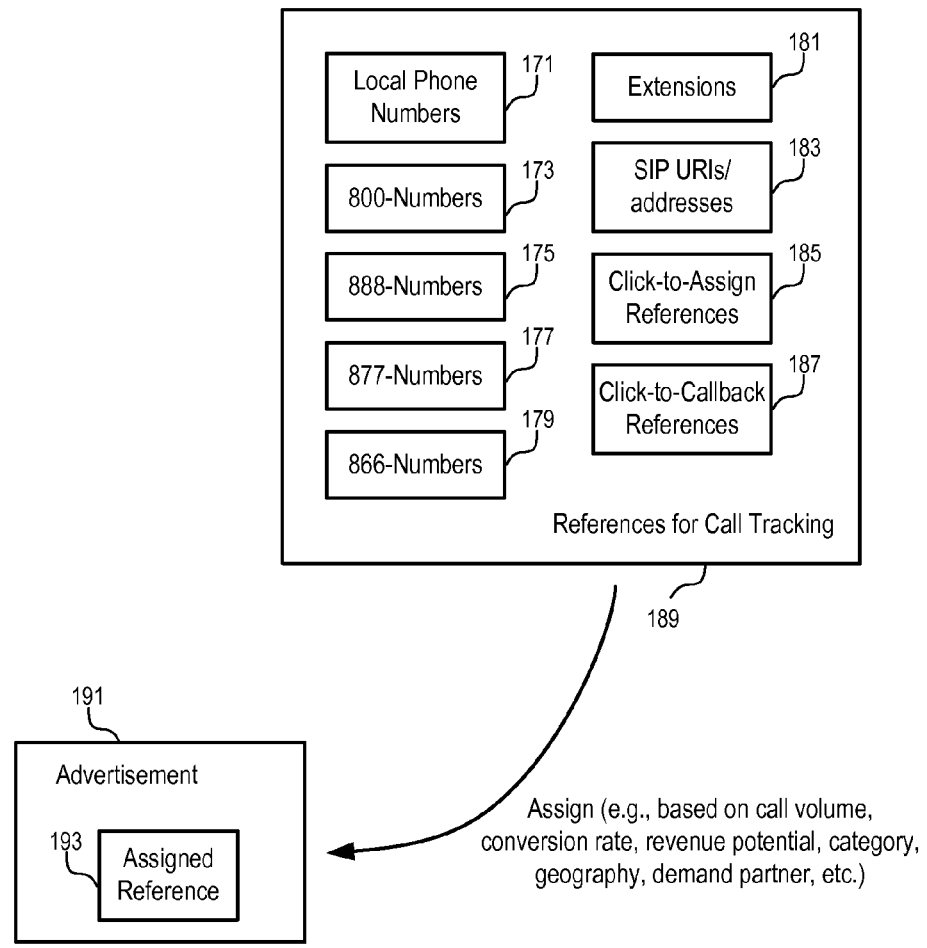
FIG. 4 shows a diagram illustrating a method to select a type of tracking mechanism with a corresponding reference for embedding in an advertisement according to one embodiment.

FIG. 4 shows a diagram illustrating a method to select a type of tracking mechanism with a corresponding reference for embedding in an advertisement according to one embodiment. In FIG. 4, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 4, a pool (189) of different types of references is maintained, such as local phone numbers (171), 800-numbers (173), 888-numbers (175), 877-numbers (177), and 866-numbers (179). Some of the references can be dynamically generated and used, such as extensions (181), SIP addresses (183), click-to-assign references (185) and click-to-callback references (187). In one embodiment, one or more of the references are selected and used as the assigned reference (193) that is embedded in the advertisement (191). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner or to a web browser of a customer). For example, the tracking mechanism used in an advertisement that is to be presented via a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement being called is estimated based on the type of media channels used to present the advertisement, the demand partner responsible to deliver the advertisement, and/or the customer who views the advertisement. Any characteristics in advertising that have an impact on the likelihood of an advertisement being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 5:
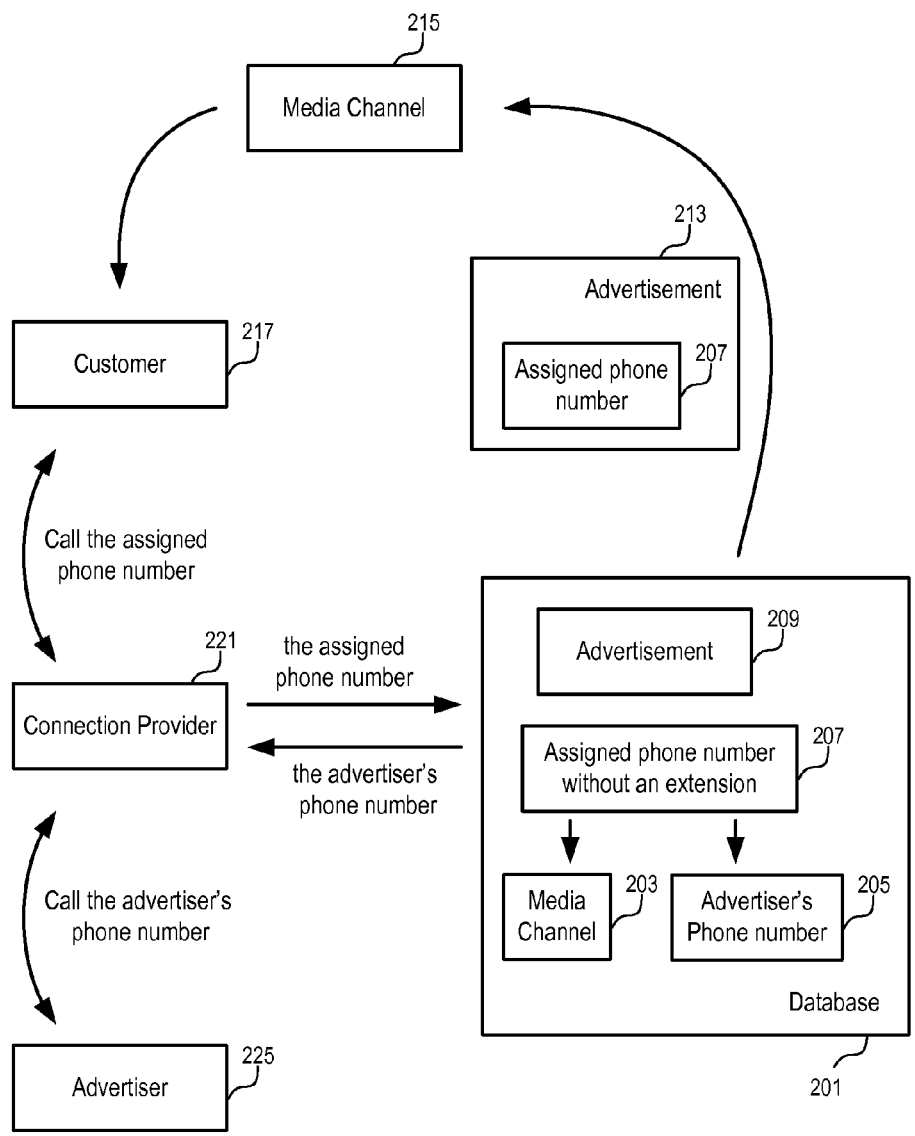
FIG. 5 illustrates an example of telephone call tracking mechanisms which can be selected according to one embodiment.

FIG. 5 illustrates an example of telephone call tracking mechanisms which can be selected according to one embodiment.

In FIG. 5, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800- (888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 6:
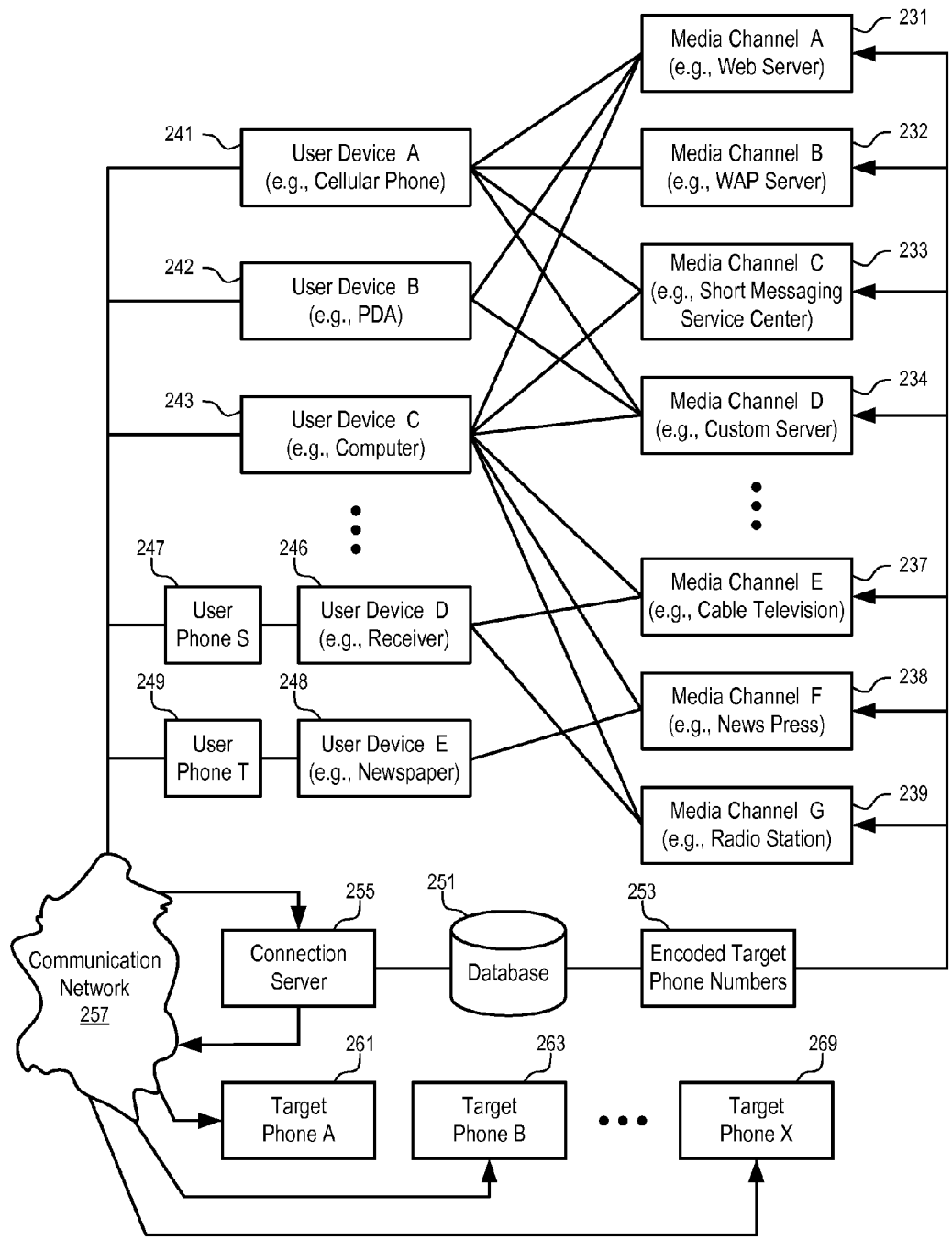
FIG. 6 shows a diagram of a system to make and track phone connections according to one embodiment.

FIG. 6 shows a diagram of a system to make and track phone connections according to one embodiment. In FIG. 6, a database (251) may contain the phone numbers of target phone A (261), target phone B (263), . . . , target phone X (269), etc. Typically, the target phones belong to the institutions, businesses, individuals, etc, which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 6, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection server with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 7:
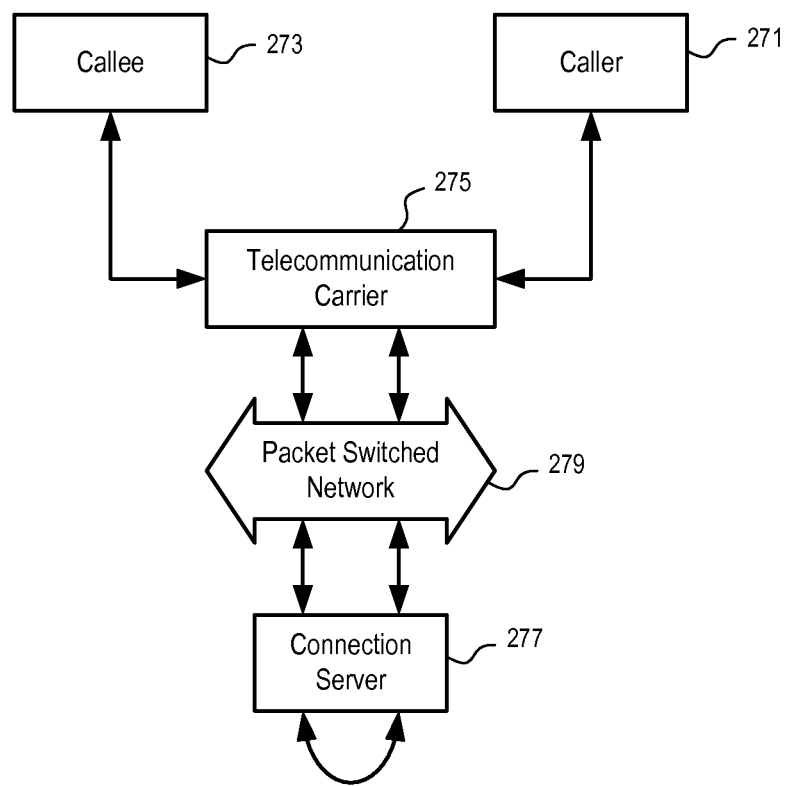
FIG. 7 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 7. In FIG. 7, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection sever (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched the network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 7, the telephone connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 8:
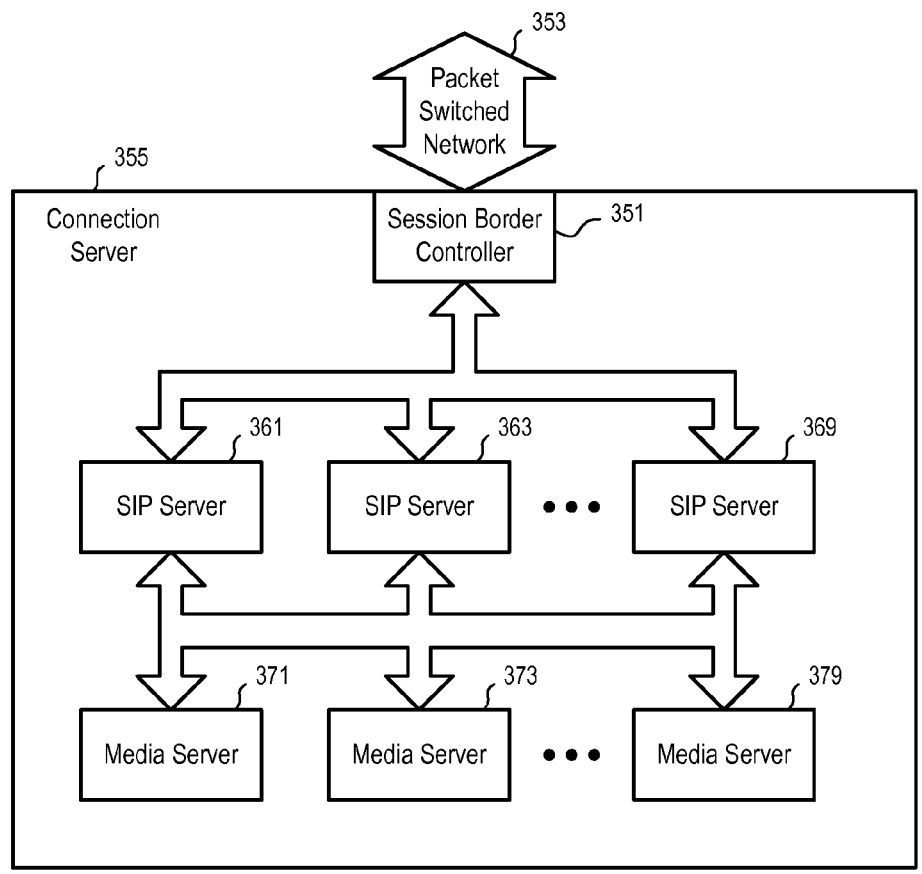
FIG. 8 shows a connection server according to one embodiment.

FIG. 8 shows a connection server according to one embodiment. In FIG. 8, the connection server (355) is configured to place and/or receive VoIP calls using Session Initiation Protocol (SIP). A session border controller (351) is used to interface with the packet switched network (353) and control the types of network traffic related to VoIP calls that might go into the connection server (355).

In one embodiment, the session border controller (351) is configured to control the signaling and media stream during the setting up, conducting and tearing down of VoIP calls to or from the connection server (355). In some embodiments, the session border controller (351) may pick up the call that comes to the session border controller (351), places a separate call from the session border controller (351), and joins the received call and the placed call to control both the signaling and media stream. In some embodiments, the session border controller (351) may perform signaling/ encoding translation to allow the connection server (355) to process the VoIP calls in one standard, while receiving VoIP calls in a variety of standards (e.g., SIP, H.323, etc.). In one embodiment, the session border controller (351) is configured to perform one or more firewall functionalities, such as denial of service protection, call filtering, bandwidth management, etc.

In one embodiment, the session border controller (351) is configured to perform media releasing operation. When the session border controller (351) determines that the source and destination of a media stream is on the same side of the session border controller (351) (e.g., both the source and the destination of the media stream is outside the connection server 355), the session border controller (351) can release the hairpinning of the media stream and allow the media stream to flow without going through the session border controller (351).

In FIG. 8, a set of SIP servers (e.g., 361, 363, . . . , 369) are networked to the session border controller (351) to receive messages for incoming calls and to initiate outgoing calls. The session border controller (351) is configured to evenly distribute the calls for processing by the SIP servers.

For example, when an incoming message for the initiation of a call is received (e.g., a SIP INVITE message from the telecommunication carrier 275), the session border controller (351) may route it to a SIP server (e.g., 361) for processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (353) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identify a media server (371) (or a virtual softphone on SIP server) as the initiator for a separate call. The SIP server then connects the calls for the media stream.

In one embodiment, the caller is first connected to a media server (e.g., 371, 373, or 379). For example, the SIP server may forward the SIP INVITE message to one or more of the media servers for answering the call. When a media server (e.g., 371) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (353) (e.g., by sending a SIP INVITE message to the telecommunication carrier 275, which further bridges the call to the callee 273). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (351) into the connection server (355). For example, the media stream can go through the telecommunication carrier (275) in FIG. 7 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (355). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (353) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (361, 363, . . . , 369) and media servers (371, 373, . . . , 379) are implemented on separate computers connected via a local area network (and/or intranet or Internet). Alternatively, at least the some of the servers can be implemented on a same computer. In one embodiment, the SIP servers and the media servers are also integrated with the session border controller (351) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (355) may further include a database server (355) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figure 9:
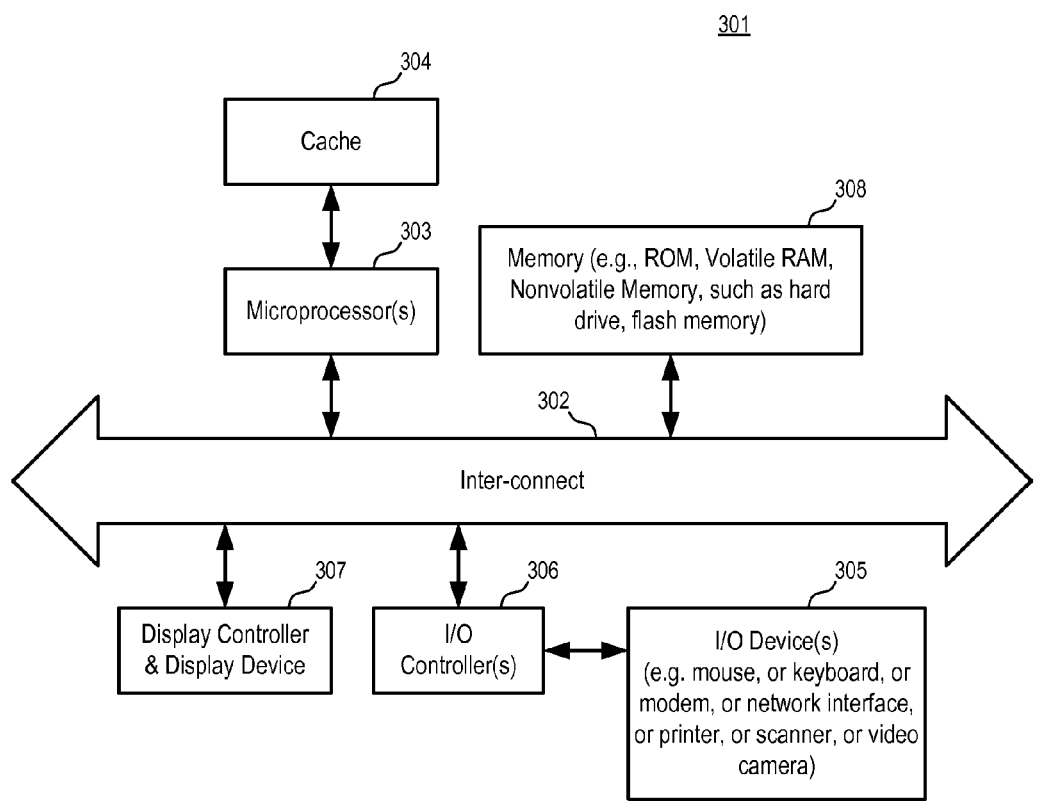
FIG. 9 shows a block diagram example of a data processing system which may be used in various embodiments.

FIG. 9 shows a block diagram example of a data processing system which may be used in various embodiments. While FIG. 9 illustrates various components of a computer system, it is not intended to represent any particular architecture or manner of interconnecting the components. Other systems that have fewer or more components may also be used.

In FIG. 9, the communication device (301) is a form of a data processing system. The system (301) includes an inter-connect (302) (e.g., bus and system core logic), which interconnects a microprocessor(s) (303) and memory (308). The microprocessor (303) is coupled to cache memory (304) in the example of FIG. 9.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 9 is used as one of the communication server(s), connection server(s), database server(s), media server(s), controller(s), router(s), gateway(s), etc.

A user terminal as a client system can be a data processing system similar to the system of FIG. 9. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

In one embodiment, after a customer uses the reference provided in the advertisement (e.g., the phone number assigned to the advertiser) to initiate a communication session in response to the advertisement, prompts may be provided to the customer (e.g., to welcome the customer, to ask the customer to confirm the connection, to inform the customer about the status of the connection process, etc.). In one embodiment, the prompts are customized based at least partially upon the communication reference that is used to initiate the communication process, the performance of the advertisements, the traffic volume of the advertisements, the revenue potential of the advertisements, and/or other attributes of the advertisements.

For example, when a phone number dialed by the customer is associated with more than one advertiser/advertisement, a prompt to the customer can be used to ensure that the customer is connected to the right advertiser. For example, when a customer is calling from outside of an area of service of an advertiser, the customer may be prompted to ensure that the customer is calling the right advertiser. In one embodiment, the information about the advertiser/advertisement is selectively used to customize the prompt during the call received from a customer who is responding to the advertisement.

Figure 10:
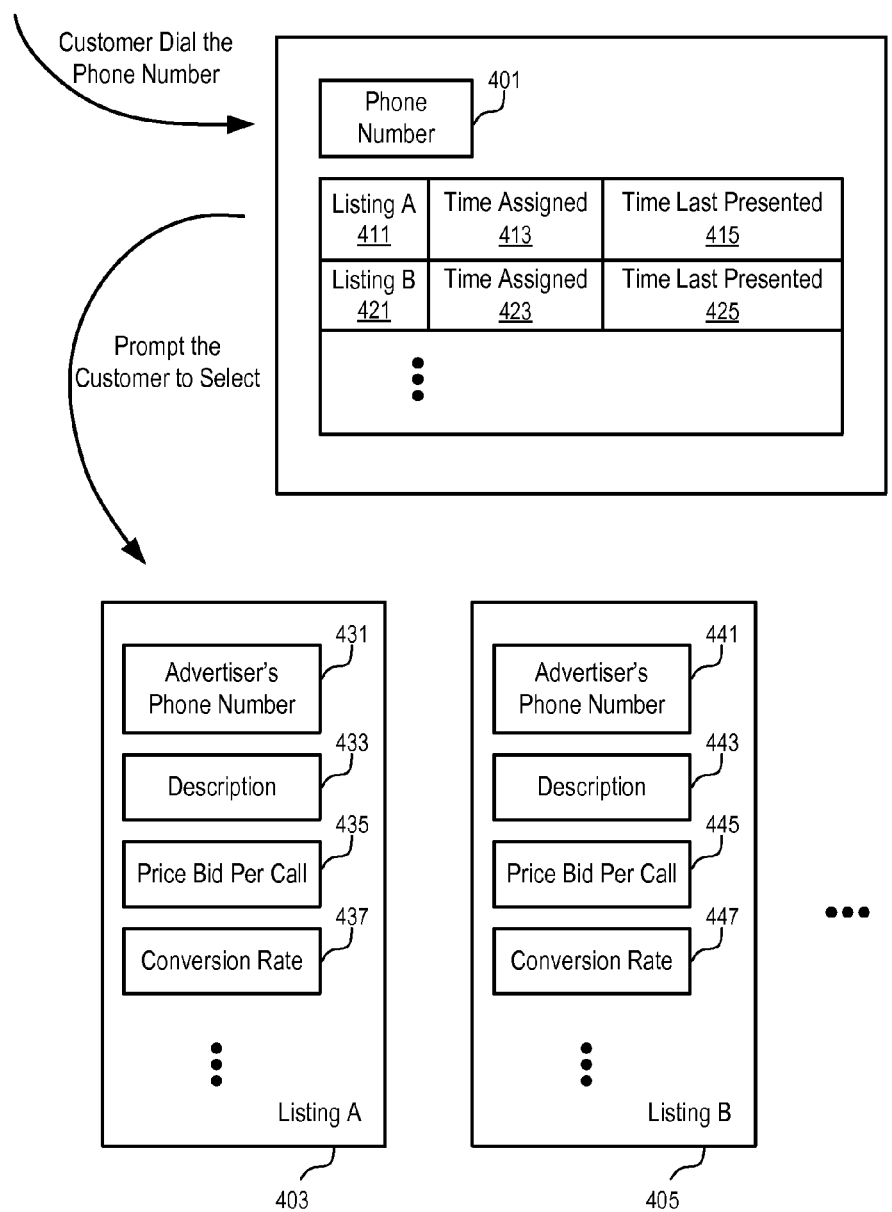
FIGS. 10-12 illustrate methods to prompt a customer responding to an advertisement according to one embodiment.
Figure 11:
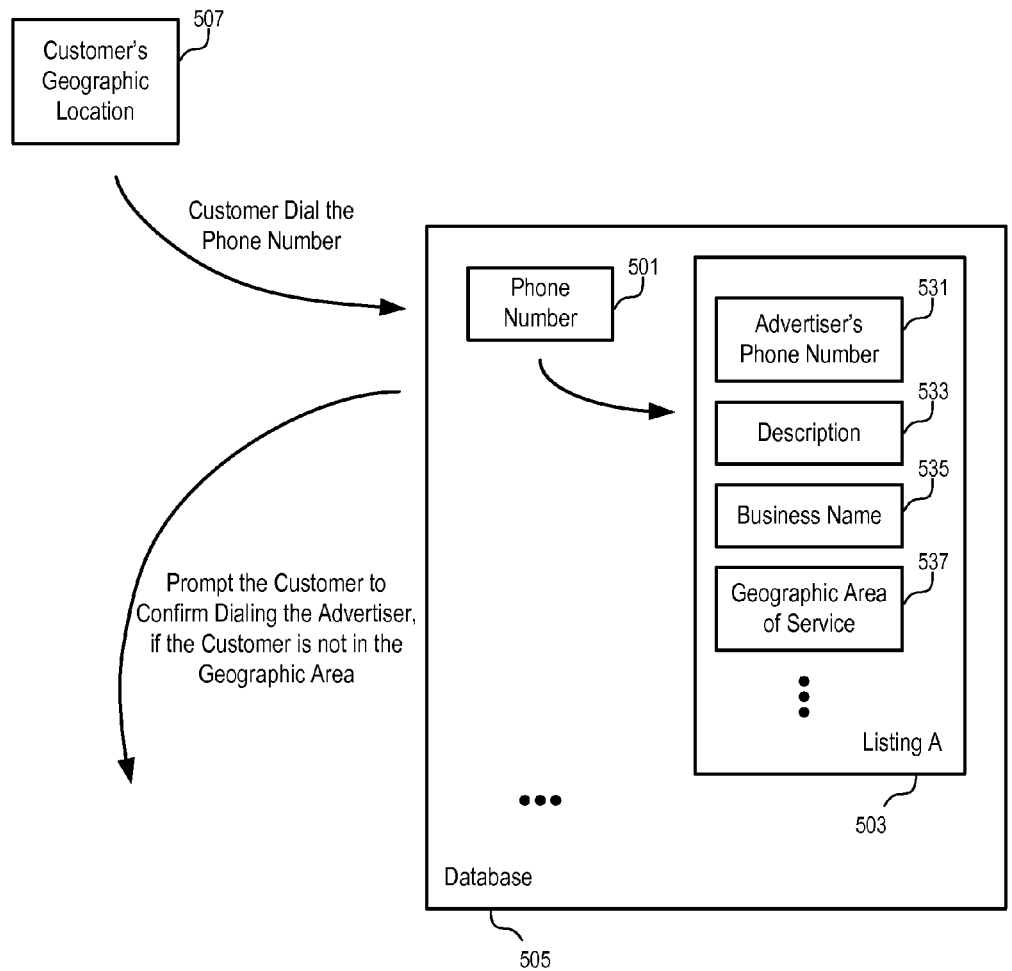
Figure 12:
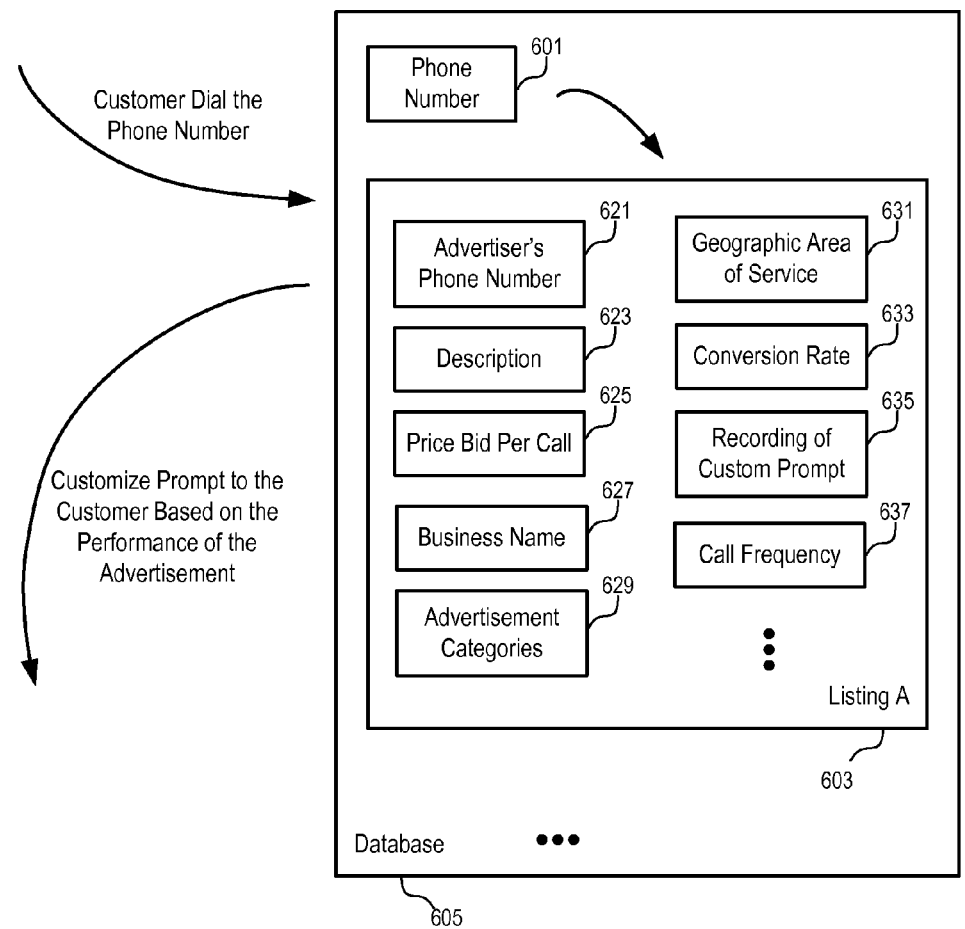

FIGS. 10-12 illustrate methods to prompt a customer responding to an advertisement according to one embodiment.

In FIG. 10, a phone number (401) can be associated with multiple advertisers/advertisement listings. The phone number (401) may or may not include an extension. Since the phone number (401) provided in an advertisement may not be sufficient to identify the advertisement/advertiser, a prompt can be dynamically generated and provided to the customer to resolve the ambiguity and to select the right advertisement/advertiser.

In one embodiment, the same communication reference, such as a phone number (401), can be assigned to multiple advertisers/advertisements. The system can track when the reference is assigned to a particular advertisement and/or when the reference is last presented in the corresponding advertisement.

For example, in FIG. 10, the phone number (401) is assigned to advertisement listing A (403) at time (413) and last presented at time (415); the phone number (401) is assigned to listing B (405) at time (423) and last presented at time (425). The identifiers (411 and 421) associate the date and/or time stamps (e.g., 413, 423, etc.) with the data of the corresponding advertisement listings (e.g., 403, 405, etc.).

In FIG. 10, the advertisement listing (403) has the advertiser's phone number (431), which is not presented to the customer. For a presentation to the customer, the advertiser's phone number (431) is replaced with the assigned phone number (401). The advertisement listing (403) has a description (433) (e.g., specified by the advertiser), a price bid per call (435) (e.g., specified by the advertiser), a conversion rate (437) (e.g., computed from statistical data to show a ratio between past presentations of the advertisement and customer phone calls resulted from the past presentations), etc. Similarly, the advertisement listing (405) has the corresponding advertiser's phone number (441), a description (443), a price bide per call (445), a conversion rate (447), etc.

In one embodiment, the date and time stamps (e.g., time assigned 413, time last presented 415, etc.) are used to determine whether the association relation between the listing and the assigned phone number has expired. Other types of data and time stamps, such as the time last called for a particular advertisement, can also be used.

In one embodiment, the time at which the phone number is assigned to an advertisement can be substantially different from the time at which the advertisement is presented. For example, an online demand partner may request the advertisement but fail to present the advertisement to a customer.

For example, a phone number may be assigned to an advertisement for advertising on a printed media; and the time at which the advertisement, including the phone number, is presented to the customer may not be available.

In another embodiment, the time at which the phone number is assigned to an advertisement may be considered as the time at which the advertisement is presented. For example, the advertisement may be presented on an interactive media which allows the customer to particularly request the display of the phone number. The phone number is assigned in response to such a request from the customer. Thus, the time at which the phone number is assigned can be substantially the same as the time at which the phone number is presented.

In one embodiment, the system uses a time period threshold to determine the expiration of the association relation and thus allow the reuse of the phone numbers without ambiguity, or with a reduced degree of ambiguity. For example, after the time period that is longer than the threshold elapses since the assignment of the phone number to the advertisement (or since the last presentation of the advertisement, or since the last received call to the advertisement via the phone number), the phone number may be considered as being no longer associated with the advertisement. Thus, records that are older than the time period threshold may be discarded or ignored during the process of identifying the advertisement/advertiser that is being called by the customer.

In one embodiment, different time period thresholds can be used to determine the expiration of the association relation between the phone number and the corresponding advertisements. The thresholds may be based on how the phone number is assigned, the type of the media channel that is used to present the advertisements, the advertisement categories of the advertisements, the performance of the advertisements, etc. For example, an assignment that is in response to the request from a customer via an interactively displayed advertisement can be set to expire in one time period; and an assignment for an offline presentation of an advertisement may be set to expire in another time period.

In one embodiment, the expiration times of the association relations are tracked directly. For example, events related to the advertisement, such as the assignment of the phone number to the advertisement, a presentation of the advertisement, and a received phone call generated from the advertisement, can be used to establish and/or update the expiration time of the association relation. For example, after the presentation of an advertisement via a web interface, the association relation may be set to expire within a period of time. The time period may be determined based on a statistical data related to the time gap between the presentation and a subsequent response to the advertisement. If within the time period, a phone call is received as a response to the advertisement, the expiration time of the association relation can be revised, in view of the phone call.

In one embodiment, a phone number is re-assigned after the previous assignments are expired. Alternatively, a phone number may be reassigned before the expiration of the previous assignments (e.g., when no other phone numbers available for assignment). For example, a phone number that is assigned to an advertisement that is less frequently called or less likely being called may also be assigned to another advertisement.

In one embodiment, when the phone number is assigned to a new advertisement and the phone number is still currently associated with an old advertisement, an extension number (or an additional extension number, or additional digits in the extension) can be provided to differentiate the advertisements. Thus, whether the customer dials the additional digits can be used to select a specific advertisement. Further, if the association relation between the old advertisement and phone number expires before a call from a customer is received, the customer does not have to dial the extension.

In another embodiment, the same phone number is assigned to the new advertisement without assigning additional digits. At the time a phone call is received at the phone number, the customer is prompted to select an advertisement.

For example, at the time a phone call to the phone number (401) is received, the data records may show that both advertisements (403 and 405) are currently associated with the phone number. Thus, the customer is asked to select one. The prompt may include presenting an aspect of the advertisement (403) to allow the customer to confirm whether the call is intended for the advertisement (403).

For example, a business name of the advertisement (403) can be presented in the prompt provided to the customer (e.g., via a text-to-speech synthesizer, or a recording of an announcer); and the customer can press a key (e.g., "#", or "*", or "1"), or provide a voice command (e.g., "connect"), to confirm that the customer is calling the advertisement (403). If the advertisement (403) is not selected, the business name of the advertisement (405) is presented in the prompt. Thus, the advertisements (e.g., 403 and 405) are sequentially presented for selection by the customer. Other aspects of the advertisements, such as the category of the advertisements, the geographic area of the advertisements, brief description of the advertisements, etc., can also be used in the prompt to formulate the selection options.

In one embodiment, the order in which the advertisements (403 and 405) are presented in the prompt for selection is determined based on the timing of association relations between the phone number and the corresponding advertisements. For example, the advertisement that is presented latest can be prompted first. For example, in the prompt, the advertisements can be presented according to the reverser order of assignments of the phone number to the corresponding advertisement.

In one embodiment, the order in which the advertisements (403 and 405) are presented in the prompt is determined based at least in part on the performance of the advertisements. For example, the advertisements (403 and 405) can be presented sequentially in the prompt based on a conversion rate of the advertisements. The conversion rate indicates the ratio between a count of presentations of an advertisement and the customer phone calls resulted from the presentation. The higher the conversion rate, the more likely the advertisement is to get customer response. Thus, the advertisement with a higher conversion rate is prompted before the advertisement with a lower conversion rate.

In one embodiment, the likelihood of the call being generated from the advertisements is estimated based on the statistical data of the past responses received for the advertisements. The advertisements (e.g., 403 and 405) are prompted in an order according to the likelihood of the call being generated from the advertisements.

In one embodiment, the advertisements are prompted in an order according to the advertisement revenue potential of the advertisements. For example, the advertisements can be prompted in the order of the price bid per call (e.g., 435 and 445) of the advertisements. The advertisement that offers the highest price bid per call is presented first. For example, assuming that the call is for a specific advertisement, the advertisement revenue that would be generated for a specific party (e.g., after deducting the portion that is earned by an advertising partner, such as a demand partner) can be computed; and the advertisements are sorted according to the computed advertisement revenue for the specific party.

In one embodiment, taking into account of the likelihood of the call being for a specific advertisement, the expectation of the advertisement revenue generated from connecting the call to the advertiser of the specific advertisement can be estimated; and the advertisements are sorted according to the expectation of the advertisement revenue for presentation in the prompt.

In one embodiment, the likelihood of a customer being not patient enough to wait through the prompt is considered and estimated. The sequence in which the advertisements are presented in the prompt is then selected to maximize/improve the expectation of the advertisement revenue generated from the received call.

In one embodiment, the system determines whether there is an indication that a customer's phone call is intended for a different advertisement. In one example, when the phone number dialed by the customer is assigned to multiple advertisements, a prompt is presented to allow the customer to select the desired advertisement. In another example, when the system determines that the customer is calling from a geographic location that is outside a geographic area of service of an advertisement that is associated with the phone number, the system may provide a prompt to ask the customer to confirm the call to the advertiser, as illustrated in FIG. 11.

In FIG. 11, the customer's geographic location (507) is determined. For example, the customer's geographic location can be determined or estimated based on the phone number from which the customer's phone call is initiated. Alternatively, for example, when the customer calls from a mobile phone, the mobile phone may determine the current location and provide the location information. Alternatively, for example, the base stations of a cellular communication network can determine the location of a cellular phone. Alternatively, the customer can provide the geographic location via the communication connection between the customer and the system (e.g., via providing a zip code).

In FIG. 11, the phone number (501) dialed by the customer is uniquely associated with advertisement (503) in the database (505). When the geographical location of the customer (507) is within the geographic area of service (537), there is no indication that the customer has dialed a wrong number; and thus, the customer can be connected to the advertiser's phone number (531) without a prompt. When the geographical location of the customer (507) is outside the geographic area of service (537), there appears a possibility that the customer may have dialed a wrong number; and thus, the customer is prompted to confirm whether the call is for the advertiser.

For example, the prompt may present the business name (535) to the customer via the phone connection to ask the customer whether the customer intends to reach the specified business. The prompt may further include the description (533) and/or other aspects of the advertisement, such as the categories of the advertisement. The customer is connected to the advertiser's phone number (531) if the customer confirms the intention; otherwise, the customer can be connected to an operator or an interactive voice response (IVR) system for the identification of the advertiser.

In one embodiment, when a phone number dialed by the customer corresponds to multiple advertisements, one or more advertisements can be eliminated by comparing the geographical location of the customer and the geographic area of services of the advertisements. For example, an advertisement having a geographic area that does not cover the geographic location of the customer is eliminated. In another embodiment, the sequence of prompting the customer for the advertisements is based on whether the geographic location of the customer is inside the geographic area of service of the corresponding advertisements.

In FIG. 12, a customer dials the phone number (601) that is associated with the advertisement listing (603) in the database (605). Before the customer is connected to the advertiser's phone number (621), the customer may be provided with a prompt for enhanced experience, based on the performance of the advertisement (e.g., conversion rate (633), call frequency (637)) and/or the price bid per call (625).

For example, when the performance of the advertisement, such as conversion rate (633), is above a threshold, a customized prompt can be provided to the customer for enhanced experience. The customized prompt may greet the customer with the business name (627), inform the customer the current status of connecting to the advertiser, provide the description (623) while the customer is waiting to be connected to the advertiser, etc. The customized prompt may optionally include the information about advertisement categories (629), geographic area of service (631), etc.

In one embodiment, whether to play a recording (635) of a custom prompt to the customer is based on the performance of the advertisement and/or the price bid of the advertisement. The custom prompt can be the recording of a human announcer, or the recording provided by the advertiser.

In one embodiment, the performance of the advertisement may be measured based on the number of phone calls generated in a time period. An advertisement having a number of calls larger than a threshold can be provided with a customized prompt to enhance customer experience.

In one embodiment, whether to customize the prompt is at least partially based upon the price bid per call (627). For example, when the price bid per call (627) of the advertisement (603) is above a threshold value, the customer of the advertisement is provided with a customized prompt. The customization of the prompt can also be based upon the revenue potential for a specific party (e.g., the connection provider/tracker). In one embodiment, multiple levels of customization are provided based on the statistical data of customer calls that are in response to the advertisement and/or the price bid per call (625).

In one embodiment, the communication references used to facilitate the tracking of communication leads generated from advertisements are organized in a hierarchical structure, such that a portion of a communication reference can be used to identify at least one attribute of a set of advertisements.

For example, a root phone number can be used to represent a common attribute of a set of advertisements; and extensions to the root phone number can be used to uniquely identify the individual advertisements. When a phone call is received at the root phone number, the common attributes associated with the root phone number can be used to customize the prompt; and the customer is further prompted to dial the extensions.

Figure 13:
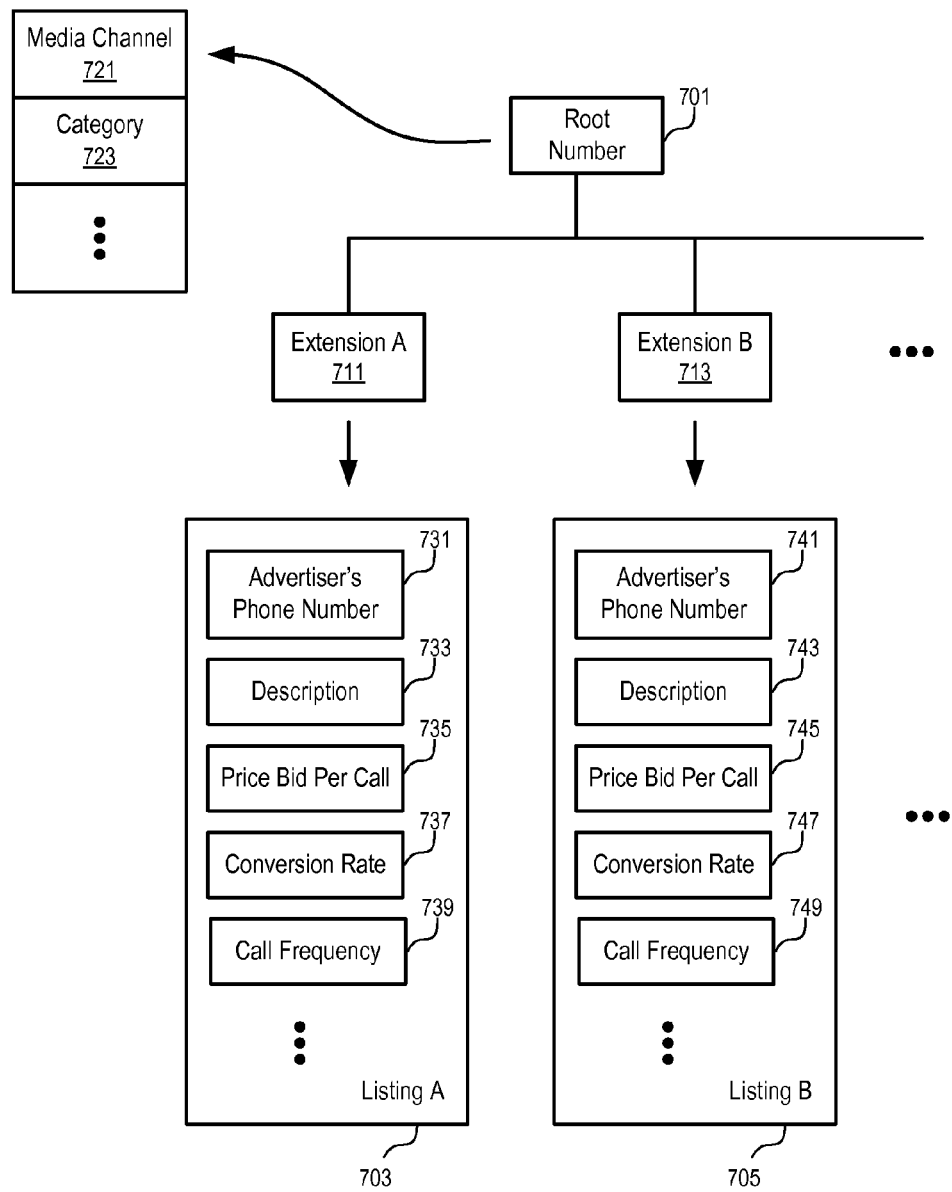
FIG. 13 shows a structure for the customization of a prompt to a customer responding to an advertisement according to one embodiment.

FIG. 13 shows a structure for the customization of a prompt to a customer responding to an advertisement according to one embodiment. In FIG. 13, a root number (701) has a number of extensions (e.g., 711, 713, etc.). A combination of the root number and an extension can be used to uniquely identify an advertisement (e.g., 703 or 705). The root number (701) can be associated with advertisement attributes that are common to the advertisements associated with the same root number (701). Examples of such attributes include the identification of a media channel (721) that is responsible for delivering the advertisements to customers, a common category (723) of the advertisements.

When the customer's phone call is connected to the root number (701), a prompt announcing the name of the media channel (721) is provided to the customer. The prompt may further include the advertisement category (723) and ask the customer to further enter the extension. After the extension is received, one of the advertisements is identified based on the received extension; and the description (e.g., 733 or 743) can be further used to customize the prompt while connecting the customer to the advertiser's phone number (e.g., 731 and 741).

FIG. 13 illustrates a one-level extension system, in which the extensions point to the corresponding advertisements. Alternatively, multiple levels of extensions can be used, in which an intermediate level extension is associated with multiple advertisements; and common attributes can be associated with the intermediate level extension, in a way similar to the association between common attributes and the root number (701).

Optionally, if the customer does not wish to enter the extension manually, the customer can be provided with the option to select one advertisement without having to enter the extension directly. Aspects of the advertisements (e.g., 703, 705) that are associated with the root phone number (or an intermediate level extension) can be presented sequentially (e.g., in an order according to the conversion rate (e.g., 737, 747, etc.), frequency of phone calls received for the advertisements (e.g., 739, 749, etc.), price bid per call (e.g., 735, 745, etc.), revenue potential, etc.); and the customer can press a key (e.g., "#", "*", "0", etc.) or speak a voice command (e.g., "connect") to select an advertisement (e.g., during or shortly after the presentation for the advertisement).

In one embodiment, when it is determined that a root number, or an intermediate extension number is sufficient to identify an advertisement (e.g., after other advertisements are no longer associated with the root number, or have been eliminated based on the geographic location of the customer), the system can customized the subsequent portion of the prompt to ask the user to confirm dialing the advertiser of the advertisement, instead of prompting the user to further dial the extension.

In one embodiment, prompts to callers are designed to decrease the connection of misdialed and/or misdirected calls through the connection provider to the advertisers. Testing results of prompts played according to embodiments of the disclosure showed that playing a prompt to the caller decreased the number of misdirected calls connected while maintaining, if not increasing, the overall call quality (e.g., call length).

For example, looking to get his car fixed, Greg searches the Internet for "San Francisco Ford Car Repair" (e.g., searching via a demand partner of the connection provider). An advertisement containing a 1-800 number of the system is retrieved and presented to Greg. Greg dials the 1-800 number of the system and hears a prompt saying, "Please hold while we connect you to Scott's Auto-Body Shop." Since Greg intended to call the auto-body shop, he remains on the line while the system connects the call through to the advertiser, Scott's Auto-Body Shop.

In another example, trying to dial a 1-800 number, John accidentally misdials to call an active number of an advertisement, such as the 1-800 number of the system assigned to the advertisement of Scott's Auto-Body Shop. Hearing a prompt saying "Please hold while we connect you to Scott's Auto-Body Shop.", John realizes that he has dialed the wrong number and hangs up the phone before it starts to ring on the advertiser side. As a result, the advertiser, Scott's Auto-Body Shop, does not receive a dirty lead and is more satisfied by the quality leads delivered by the system.

In one embodiment, the prompts to callers are designed in a way to improve the caller experience and the quality of leads delivered.

Figure 14:
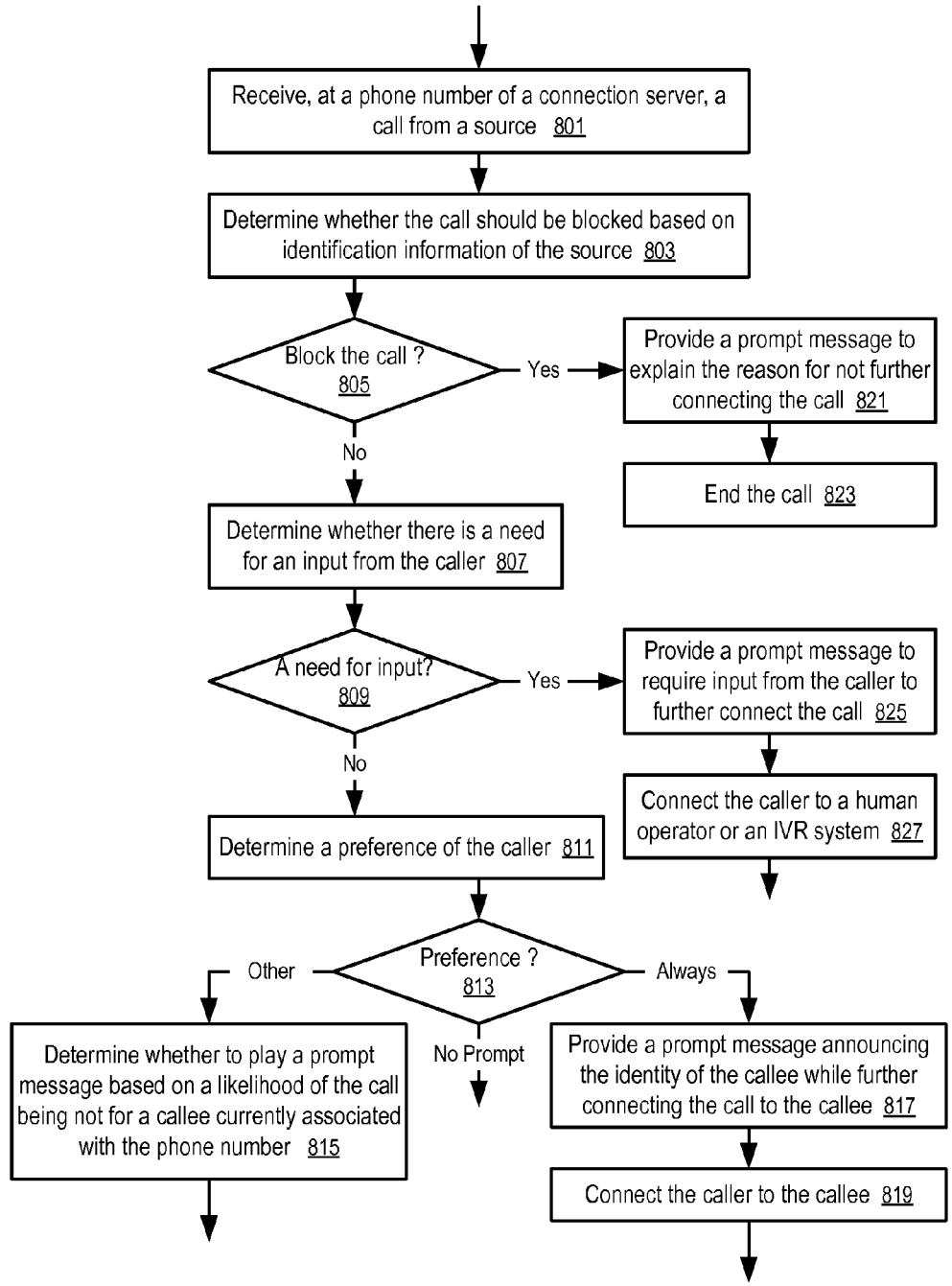
FIG. 14 shows a method to provide prompt according to one embodiment.

FIG. 14 shows a method to provide prompt according to one embodiment. In FIG. 14, different types of prompts are played under various different situations, which are examined, detected or determined by the connections server.

In FIG. 14, after a call is received (801) at a phone number of a connection server from a source, it is determined (803) whether the call should be blocked based on identification information of the source. If (805) the call is to be blocked, a prompt message is provided (821) to explain the reason for not further connecting the call; and the call is ended (823).

For example, if the system determines that the caller's phone number as determined via an automatic number identification (ANI) service is not valid, a prompt message such as "We're sorry, our system has detected that you are calling from a telephone number that is not valid. If you feel that you have reached this message in error, please contact us at 1-800-549-1744." is played to the caller, explaining that the call will not be connected and offering no mechanism to connect.

In one embodiment, the calls from phone numbers associated with known spammers or from callers who have been complained about by the advertisers are blocked.

In FIG. 14, if (805) the call is not to be blocked, it is determined (807) whether there is a need for an input from the caller. If (809) there is a need for an input from the caller, a prompt message is provided (825) to the caller to require input from the caller to further connect the call to the advertiser; and the caller is connected (827) to a human operator or an IVR system to obtain the required input.

For example, if the connection server have received more than a threshold number of calls from the phone number of the current caller within a predetermined time period, a prompt message such as "To connect to Scott's Auto-Body Shop, please press 1. If this is not the business you are trying to reach, please press 9." is played to the caller, asking the caller to take an action in order to be connected through to the advertiser associated with the phone number dialed by the caller. Thus, if there is no human behind the call to provide the correct input, the call can be blocked.

In one embodiment, the connection server checks if the call is received from an auto-dialer. For example, based on call statistics, such as the speed of dialing a call, the pattern of phone numbers called (e.g., calling numbers in a sequential pattern), etc., the connection server may identify certain calling phone numbers as potential auto-dialers. The connection server can maintain a list of calling phone numbers that are potential auto-dialers and check the current calling phone number against the list.

Further, in one embodiment, the connection server can estimate the probability/likelihood of the calling phone numbers being auto-dialers based on the collected data about past calls. When the connection server determines that the current call is likely from an auto-dialer, a prompt message can be played to ask the caller to take an action.

In one embodiment, a prompt message can be played to require an input from the caller to confirm the call, to confirm the call to the advertiser currently associated with the phone number dialed by the caller, to confirm an identity of the caller, to collect payment information, etc.

In FIG. 14, if (809) there is no need for an input from the caller, a preference of the caller is determined (811). The caller may have previously indicated to the system a preference (813) about the prompt. The caller may indicate the preference via registering with the system and associate a preference option with a phone number of the caller. Alternatively, the caller may indicate a preference in a prior phone call to the connection server.

In FIG. 14, when the preference (813) of the caller is to always play a prompt message, a prompt message is provided (817) to announce the identity of the callee while the connection server is connecting the call to the callee. The connection server can connect the caller (819) to the callee without further input from the callee.

For example, a no-action-required prompt such as "Please hold while we connect you to Scott's Auto-Body Shop" can be played to identify the callee, asking the caller to stay on the line in order to be connected through to the advertiser who is currently associated with the phone number dialed by the caller.

When the preference (813) of the caller is "no prompt," the connection server can connect the caller to the advertiser associated with the phone number dialed by the caller without providing the prompt message.

Alternatively, the caller may set the preference (813) to let the system decide whether to play a prompt message. The connection server then determines (815) whether to play a prompt message based on a likelihood of the call being not for a callee currently associated with the phone number, as illustrated in FIG. 15.

Figure 15:
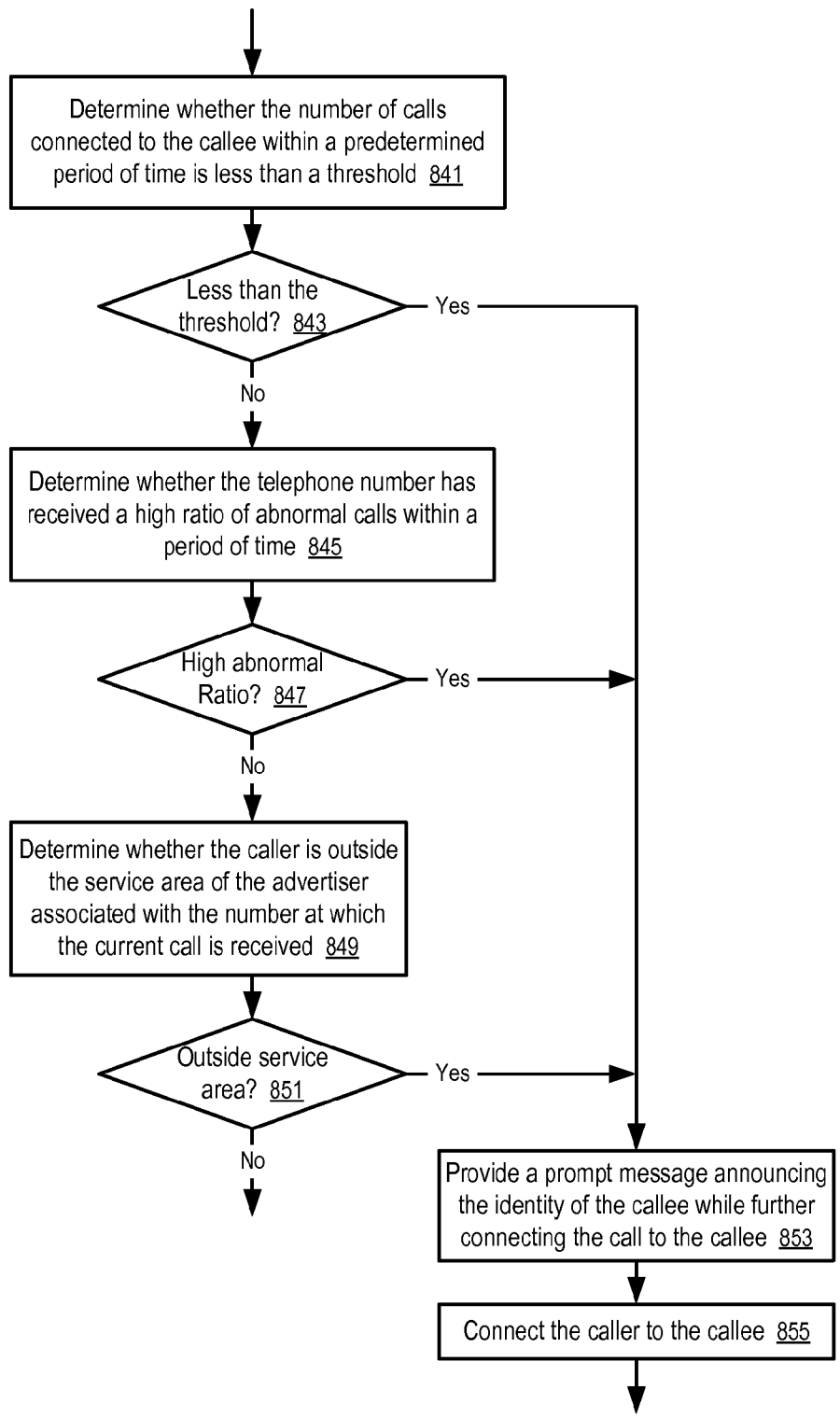
FIG. 15 shows a method to determine whether to play a prompt identifying the callee based on various indicators of the likelihood of a call being not for the callee who is currently associated with the phone number being called according to one embodiment.

FIG. 15 shows a method to determine whether to play a prompt identifying the callee based on various indicators of the likelihood of a call being not for the callee who is currently associated with the phone number being called according to one embodiment.

In FIG. 15, the connection server determines (841) whether the number of calls connected to the callee (the advertiser currently associated with the phone number dialed by the caller) is less than a threshold within a predetermined period of time. If (843) the number of calls connected to the callee is less than the threshold, a prompt message announcing the identity of the callee is provided (853), not requiring the user to take an action; and the caller is connected (855) to the callee without further input from the caller.

In FIG. 15, the connection server determines (845) whether the telephone number dialed by the caller has received a high ratio of abnormal calls within a period of time. If (847) a high abnormal ratio is detected, a prompt message announcing the identity of the callee is provided (853); and the caller is connected (855) to the callee.

For example, the connection server can compute real-time ratios for different time periods of calls to the phone number dialed by the caller and comparing the ratios to the historical average computed over a predetermined period of time (e.g., the last 30 days). For example, the connection server can calculate the ratio of short calls in calls received at the phone number in the last 5 minutes, last 30 minutes, last 6 hours, last 12 hours, and last 24 hours, etc. . . . . If any of these ratios are greater than the historical average over the last 30 days multiplied by a factor, the connection server may consider this phone number dialed by the caller "dirty", since there is a high probability that the caller dials the phone number with an intention to reach a party other than the advertiser currently associated with the phone number. Thus, a caller prompt that does not require the user to take action can be provided to reduce or avoid the chance of delivering a dirty lead to the advertiser. After the ratios of abnormal calls fall back to the normal range, the caller prompt may not be needed.

One example of a dirty phone number is a misprinted number in a newspaper advertisement. Another example of a dirty phone number is a phone number that was previously allocated to a different advertiser. The connection server can perform the dirty phone number check based on the ratio of abnormal calls and/or other indicators. For example, when the time duration between the presentation/allocation of a phone number for a previous advertiser and the presentation/ allocation of the same phone number for the current advertiser, the phone number can be considered dirty and need a prompt. In one embodiment, the prompt may allow the user to select from being connected to the current advertiser and being connected to the previous advertiser. A user input may be optional, if the user wants to be connected to the advertiser who is currently associated with the phone number.

In FIG. 15, the connection server determines (849) whether the caller is outside the service area of the advertiser associated with the number at which the current call is received. If (851) the caller is current outside the service area of the advertiser, a prompt message announcing the identity of the callee is provided (853); and the caller is connected (855) to the callee.

For example, if the caller is calling from a landline or a cell phone that is determined to be currently outside the advertisement's service area, a prompt is played to identify the advertiser and/or the service area of the advertiser, without requiring the user to take an action while the connection server makes the connection.

In one embodiment, the determinations made by the connection server, as illustrated in FIG. 15, can be performed in various different sequences and combinations. More or less of the determinations of the likelihood of a call being not for the advertiser who is currently associated with the phone number being called can be implemented. Further, at least some of the situations may be selected to require a user input to confirm the connection to the callee.

In one embodiment, local telephone numbers of a connection server are assigned dynamically to advertisements just in time when the advertisements are requested for presentation. The use of local telephone number in advertisements for connecting callers to the respective advertisers of the advertisements can increase call through rates. For example, local telephone numbers can convert better than toll free numbers in at least some situations.

In one embodiment, local telephone numbers of the connection server are assigned to the advertisements based on a number of considerations. For example, when the service area of the advertiser is small, a local telephone number representative of the service area can be assigned to the advertisement. For example, when the request for advertisements includes a location based query criterion, a local telephone number representative of the area according to the location requirement can be assigned to the advertisement. For example, information about the location of the end user to who the advertisement is to be presented can be used to select the local telephone number. For example, the IP address of a query submitted from the end user can be used to determine the location of the user and assign a local telephone number accordingly. A telephone call to the local telephone number may or may not be toll free.

Figure 16:
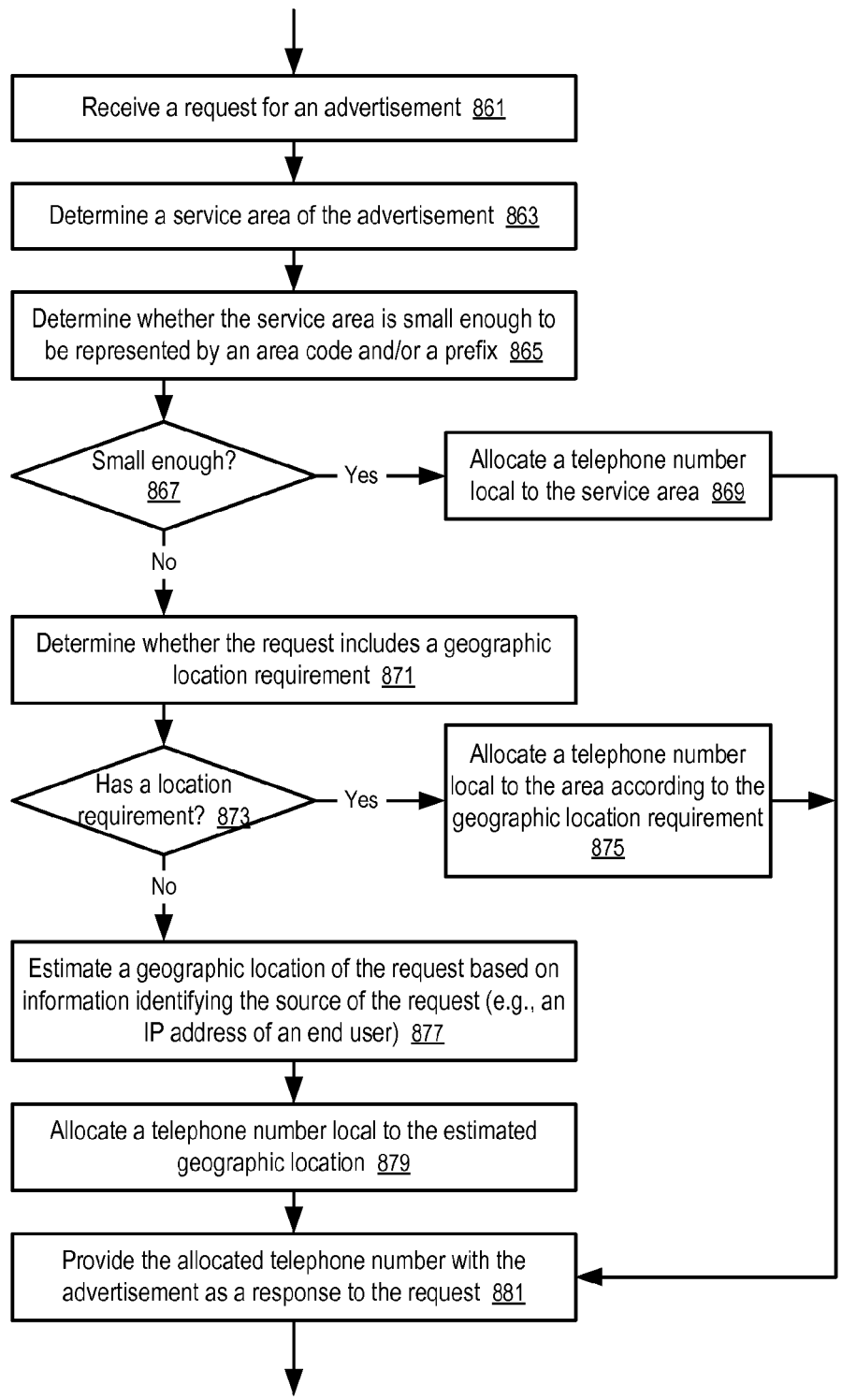
FIG. 16 shows a method to dynamically allocate local telephone numbers according to one embodiment.

FIG. 16 shows a method to dynamically allocate local telephone numbers according to one embodiment. In FIG. 16, after receiving (861) a request for an advertisement, such as a search request, a service area of the advertisement is determined (863). In one embodiment, the service area of the advertisement is part of the specification of the advertisement and can be looked up from the advertisement database.

In FIG. 16, it is determined (865) whether the service area is small enough to be represented by an area code and/or a prefix of a telephone number. If (867) it is small enough, a telephone number local to the service area is allocated (869) for the advertisement; and the allocated telephone number is provided (881) with the advertisement as a response to the request.

For example, when the service area of an advertisement is of a small, confined area, such as a zip code, city or region, the advertisement for a local area can be assigned a local telephone number according to the service address of the advertisement. For example, when Greg queries for a car dealer in San Francisco, an advertisement of a car dealer can be assigned a local telephone number that is representative of the service address of the car dealer. When Scott executes the same query, the same local number is returned in the same advertisement.

In FIG. 16, if the service area of the advertisement is not of a small, confined area, it is determined (871) whether the request includes a geographic location requirement. If (873) the request includes a location requirement, a telephone number local to the area according to the geographic location requirement is allocated (875) for the advertisement.

For example, the location modifier of a query can be used to select the local number that is to be returned as the contact information of the advertisement. For example, Charlie's Boats has an advertisement with a service area covering California. When Greg queries for a boat dealer in San Francisco, the advertisement for Charlie's Boats is returned with a local number (e.g., 415-243-xxxx) that is representative of the San Francisco city. However, when Scott queries for a boat dealer in Los Angeles, the advertisement for Charlie's Boats is returned with a local number (e.g., 310-944-xxxx) that is representative of the Los Angeles city. The telephone calls from Greg and Scott, received at the different local numbers, can be connected to the same phone number of Charlie's Boats. Alternatively, when Charlie's Boats have different offices in California, the telephone calls from Greg and Scott can be connected to the nearest offices of Charlie's Boats.

In FIG. 16, if (873) the request includes no location requirement, a geographic location of the request is estimated (877) based on information identifying the source of the request (e.g., an IP address of an end user). A telephone number local to the estimated geographic location is allocated (879) and provided (881) with the advertisement as a response to the request.

For example, when no location information was provided in a query, the IP address of the query can be used to derive a telephone number that is local to the location from which the query is received. For example, Greg can execute a query from within San Francisco and be presented with an advertisement having a local telephone number (e.g., 415-243-xxxx) that is representative of the San Francisco city, while Scott can query from Los Angeles and be presented with an advertisement having a local telephone number (e.g., 310-944-xxxx) that is representative of the Los Angeles city.

For example, when the query is received from a cellular phone, a cellular base station that is in communication with the cellular phone can be used to estimate the location of the cellular phone. For example, when the request is received via a wireless access point, the location of the access point can be used to estimate the location of the requester. For example, when the request is received via a demand partner, the demand partner may provide a location indication about the request. For example, a location preference of a registered user can be used to estimate the location for the query from the user.

In one embodiment, when no accurate location can be estimated for the request to determine a local phone number, a toll free telephone number is allocated for the advertisement that has a wide service area.

In one embodiment, to limit the cost associated with building and managing inventory of many local numbers required to have coverage across one or more large geographical areas, local numbers with extensions could be used to uniquely represent different advertisers and/or other parameters to be tracked, such as the identities of the demand affiliates, bid prices, etc.

For example, different tiers of services can be provided for demand affiliates. For example, demand affiliate A that generates less than a threshold number of queries (e.g., one million a month) may be issued local numbers of the connection provider with different extensions for different advertisements. For example, demand affiliate B that generates more than a threshold number of queries (e.g., one million a month) may be issued local numbers of the connection provider without an extension.

Whether an advertisement is assigned a local number without an extension or a local number with an extension can be determined based on the performance of the advertisement. For example, advertisements received greater than a threshold number of calls (e.g., 100 calls a month) may be assigned local numbers without an extension, whereas advertisements received less than a threshold number of calls (e.g., 100 calls a month) can be assigned local numbers with extensions. For example, whether an advertisement is assigned a local number without an extension or a local number with an extension can be determined based an earning potential of presenting the advertisement via the demand affiliate, or a bid price of the advertiser, or the current availability of clean local telephone numbers.

Figure 17:
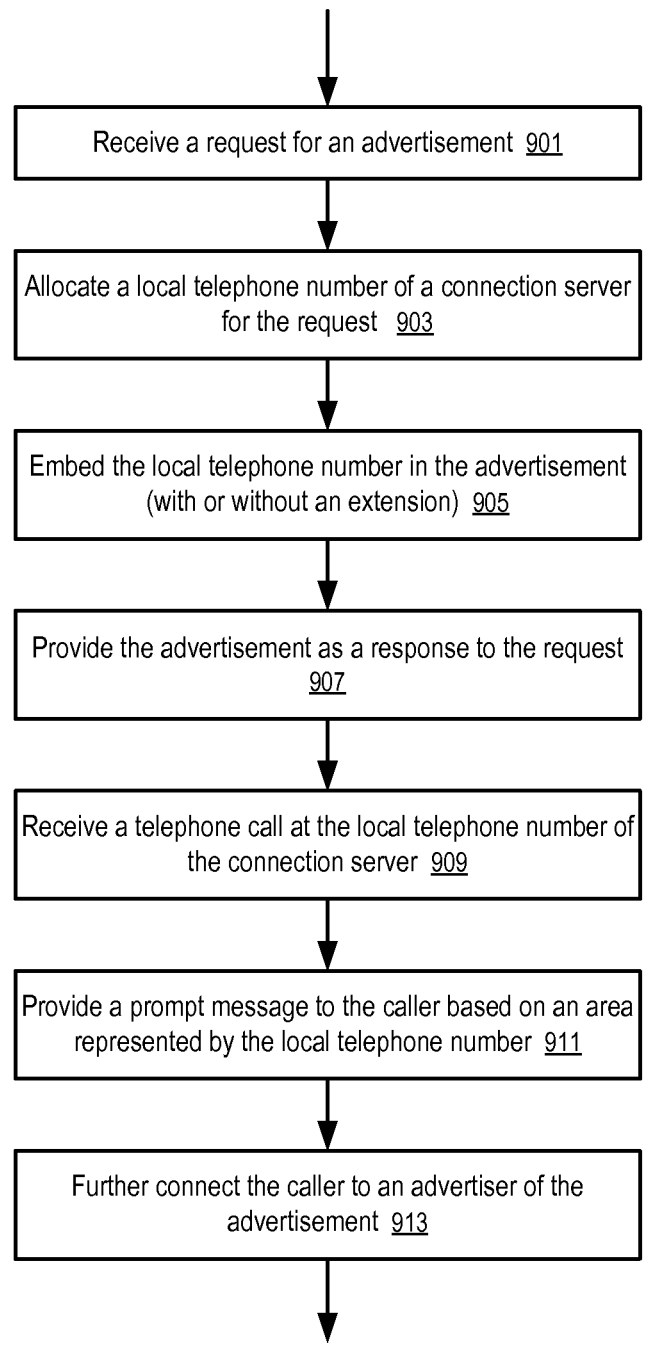
FIG. 17 shows a method to provide a voice connection via a local telephone number according to one embodiment.

FIG. 17 shows a method to provide a voice connection via a local telephone number according to one embodiment. In FIG. 17, after a request for an advertisement is received (901), a local telephone number of a connection server is allocated (903) for the request. The local telephone number is embedded (905) in the advertisement (with or without an extension). The advertisement is provided (907) as a response to the request.

In one embodiment, responsive to a request from a user, a telephone number is selected from a plurality of telephone numbers of a connection server to match a location indicator of the request. The selected telephone number to be embedded in the advertiser and be used by the user to initiate a telephone call to the connection server for further connection to an advertiser of the advertisement. In one embodiment, the plurality of telephone numbers are local to a plurality of different cities.

In one embodiment, the location indicator comprises a location search criterion submitted by the user as part of the request. In another embodiment, the location indicator of the request is determined based on an identifier of the user received with the request, such as a phone number of the user, an Internet address of the user, a member ID of the user, etc. In one embodiment, the location indication of the request is determined based on a location of a wireless access point used by the user to submit the request.

After a telephone call is received (909) at the local telephone number of the connection server, a prompt message is provided (911) to the caller based on an area represented by the local telephone number. The caller is further connected (913) to an advertiser of the advertisement.

In one embodiment, responsive to receiving the telephone call at the telephone number of the connection server from the user, it is determined whether to play a prompt message to the user, based at least in part on statistic data about telephone calls collected at the connection server, such as a number of calls connected to the advertiser within a predetermined period of time, a number of abnormal calls connected to the advertiser within a predetermined period of time, a number of calls received from the user within a predetermined period of time, etc.

In one embodiment, a prompt message is played in the telephone call to the user in response to a determination that the number of calls connected to the advertiser is below a threshold within the predetermined period of time.

In one embodiment, a prompt message is played to the user in response to a determination that the number of calls received from the user within the predetermined period of time is above a threshold; and the telephone call is connected to an interactive voice response (IVR) system or a human operator for an input from the user. After the required input is received via the IVR system or the human operator, the telephone call is connected to the advertiser.

In one embodiment, responsive to receiving the telephone call at the telephone number of the connection server from the user, it is determined whether to play a prompt message to the user based at least in part on an average speed of making calls by the user during a period of time. When the average speed is above a threshold, a prompt message is played to the user in the telephone call; the telephone call is connected to an interactive voice response (IVR) system or a human operator for an input from the user; and after the required input is received, the telephone call is further connected to the advertiser.

In one embodiment, responsive to receiving the telephone call at the telephone number of the connection server from the user, it is determined whether to play a prompt message to the user based at least in part on whether a valid telephone number of the user can be determined via an automatic number identification (ANI) service. When no valid telephone number of the user can be determined from the ANI service, a prompt message is played to the user in the telephone call to terminate the telephone call.

In one embodiment, responsive to receiving the telephone call at the telephone number of the connection server from the user, it is determined whether to play a prompt message to the user based at least in part on a preference received from the user prior to the telephone call. For example, the user may specify the preference of "no prompt", "always prompt" or "let the system decide". Different sets of options can be offered in different embodiments.

In one embodiment, the connection server can receive a first Voice over Internet Protocol (VoIP) call via a telecommunication carrier from the user using the telephone number provided in the advertisement, determine a telephonic reference of the advertiser based on the telephone number used receive the first VoIP call, initiate a second Voice over Internet Protocol (VoIP) call via a telecommunication carrier to the advertiser using the telephonic reference of the advertiser, and bridge the first and second VoIP calls to connect the user and the advertiser. In one embodiment, a media connection that does not go through the connection server is established to connect the user and the advertiser and to bridge the first and second VoIP calls.

In one embodiment, responsive to receiving the telephone call at the telephone number of the connection server from the user, a prompt message in the telephone call is customized for the user based on a geographic area represented by the telephone number. For example, the prompt message can be customized to identify the advertiser when a location of the user as determined for the telephone call is outside the geographic area represented by the telephone number.

In one embodiment, the advertiser is to be charged an advertisement fee responsive to the connection server connecting the telephone call of the user to the advertiser; and the advertisement fee is determined based on a bid price specified by the advertiser.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

That which is claimed:

1. A method, comprising:
    storing by a server system a plurality of advertisements in association with respective specifications of respective geographic areas of service in a database of the server system;
    processing, by the server system, a transmission from an end-user device associated with a user to facilitate a user interface presented with an application of the end-user device, the transmission corresponding to a request for an advertisement from the user made with the user interface, the transmission comprising query information;
    in response to the request from the user:
        determining, by the server system, a location indicator relating to the request, the determining comprising:
            processing the query information to identify whether the query information comprises a location search criterion;
            consequent to identifying that the query information comprises the location search criterion, basing the location indicator at least partially on the location search criterion:
            consequent to identifying that the query information does not comprise the location search criterion, estimating the location indicator based at least partially on processing source information about the request;
        searching by the server system the database to identify a first advertisement based at least in part on the query information and the location indicator, the location indicator corresponding to one or more specifications of a first geographic area of service associated with the first advertisement;
        generating by the server system a second advertisement comprising a telephone number of a connection server based at least in part on the first advertisement stored in association with the one or more specifications of the first geographic area of service, the telephone number of the connection server (a) allocated to the second advertisement from a plurality of telephone numbers stored by a database server of the server system, and (b) being a local telephone number with respect to a location corresponding to the location indicator and the first geographic area of service associated with the first advertisement, wherein the plurality of telephone numbers each correspond to one of a plurality of different locations, the generating comprising:
            embedding, by the server system, the telephone number in the second advertisement, the telephone number used by the user to initiate a telephone call to the connection server for further connection to an advertiser of the second advertisement; and
            transmitting, by the server system, the second advertisement with the telephone number of the connection server as a response to the request.

2. The method of claim 1, wherein the location indicator comprises a location search criterion submitted by the user as part of the request.

3. The method of claim 1, further comprising:
    determining the location indicator of the request based on an identifier of the user from whom the request is received.

4. The method of claim 3, wherein the identifier of the user includes one of a phone number of the user, an Internet address of the user, and a member identification of the user.

5. The method of claim 1, further comprising:
    determining the location indication of the request based on a location of a wireless access point used by the user to submit the request.

6. The method of claim 1, further comprising:
    responsive to receiving the telephone call at the telephone number of the connection server from the user, determining whether to play a prompt message to the user based at least in part on statistical data about telephone calls collected at the connection server.

7. The method of claim 6, wherein the statistical data includes a number of calls connected to the advertiser within a predetermined period of time; and the method further comprising:
    playing the prompt message to the user in the telephone call in an instance in which the number of calls is below a threshold within the predetermined period of time.

8. The method of claim 6, wherein the statistical data includes a number of abnormal calls connected to the advertiser within a predetermined period of time.

9. The method of claim 6, wherein the statistical data includes a number of calls received from the user within a predetermined period of time; and the method further comprises:
   playing the prompt message to the user in an instance in which the number of calls received from the user within the predetermined period of time is above a threshold;
   connecting the telephone call to an interactive voice response system for an input from the user; and
   in response to an input received via the interactive voice response system, further connecting the telephone call to the advertiser.

10. The method of claim 9, wherein the presentations of the advertisement are through a specific media channel among a plurality of media channels in which the advertisement is presented.

11. The method of claim 1, further comprising:
   responsive to receiving the telephone call at the telephone number of the connection server from the user, determining whether to play a prompt message to the user based at least in part on whether a valid telephone number of the user can be determined using an automatic number identification service; and
   playing a prompt message to the user in the telephone call to terminate the telephone call in an instance in which no valid telephone number of the user can be determined from the automatic number identification service.

12. The method of claim 1, further comprising:
   responsive to receiving the telephone call at the telephone number of the connection server from the user, determining whether to play a prompt message to the user based at least in part on a preference received from the user prior to the telephone call.

13. The method of claim 1, further comprising:
   the connection server receiving, via a telecommunication carrier, a first voice over Internet protocol call from the user using the telephone number provided in the second advertisement;
   determining a telephonic reference of the advertiser based on the telephone number used to receive the first voice over Internet protocol call;
   the connection server initiating, via a telecommunication carrier, a second voice over Internet protocol call to the advertiser using the telephonic reference of the advertiser; and
   bridging the first voice over Internet protocol call and the second voice over Internet protocol call to connect the user and the advertiser.

14. The method of claim 13, wherein the bridging of the first voice over Internet protocol call and the second voice over Internet protocol call includes establishing a media connection that does not go through the connection server to connect the user and the advertiser.

15. The method of claim 1, further comprising:
   responsive to receiving the telephone call at the telephone number of the connection server from the user, customizing a prompt message in the telephone call for the user based on a geographic area represented by the telephone number.

16. The method of claim 15, wherein the prompt message identifies the advertiser in an instance in which a location of the user as determined for the telephone call is outside the geographic area represented by the telephone number.

17. The method of claim 1, wherein the advertiser is charged an advertisement fee responsive to the connection server connecting the telephone call of the user to the advertiser; and the advertisement fee is determined based on a bid price specified by the advertiser.

18. One or more non-transitory, computer-readable media storing instructions that, when executed by a server system, cause the server system to:
   store a plurality of advertisements in association with respective specifications of respective geographic areas of service in a database of the server system;
   process a transmission from an end-user device associated with a user to facilitate a user interface presented with an application of the end-user device, the transmission corresponding to a request for an advertisement from the user made with the user interface, the transmission comprising query information;
   in response to the request from the user:
      determine a location indicator relating to the request, the determining comprising:
         processing the query information to identify whether the query information comprises a location search criterion;
         consequent to identifying that the query information comprises the location search criterion, basing the location indicator at least partially on the location search criterion;
         consequent to identifying that the query information does not comprise the location search criterion, estimating the location indicator based at least partially on processing source information about the request;
      search the database to identity a first advertisement based at least in part on the query information and the location indicator, the location indicator corresponding to one or more specifications of a first geographic area of service associated with the first advertisement;
      generate a second advertisement comprising a telephone number of a connection server based at least in part on the first advertisement stored in association with the one or more specifications of the first geographic area of service, the telephone number of the connection server (a) allocated to the second advertisement from a plurality of telephone numbers stored by a database server of the server system, and (b) being a local telephone number with respect to a location corresponding to the location indicator and the first geographic area of service associated with the first advertisement, wherein the plurality of telephone numbers each correspond to one of a plurality of different locations, the generating comprising:
         embedding the telephone number in the second advertisement, the telephone number used by the user to initiate a telephone call to the connection server for further connection to an advertiser of the second advertisement; and
      transmit the second advertisement with the telephone number of the connection server as a response to the request.

19. A system, comprising:
   a server system comprising a connection server, a database server, a database, memory storing instructions, one or more servers coupled with the memory to execute the instructions, the instructions configured to instruct the one or more servers to:

store a plurality of advertisements in association with respective specifications of respective geographic areas of service in the database:

process a transmission from an end-user device associated with a user to facilitate a user interface presented with an application of the end-user device, the transmission corresponding to a request for an advertisement from the user made with the user interface, the transmission comprising query information;

in response to the request from the user:

determine a location indicator relating to the request, the determining comprising:

processing the query information to identify whether the query information comprises a location search criterion;

consequent to identifying that the query information comprises the location search criterion, basing the location indicator at least partially on the location search criterion:

consequent to identifying that the query information does not comprise the location search criterion, estimating the location indicator based at least partially on processing source information about the request;

search the database to identity a first advertisement based at least in part on the query information and the location indicator, the location indicator corresponding to one or more specifications of a first geographic area of service associated with the first advertisement;

generate a second advertisement comprising a telephone number of a connection server based at least in part on the first advertisement stored in association with the one or more specifications of the first geographic area of service, the telephone number of the connection server (a) allocated to the second advertisement from a plurality of telephone numbers stored by the database server of the server system, and (b) being a local telephone number with respect to a location corresponding to the location indicator and the first geographic area of service associated with the first advertisement, wherein the plurality of telephone numbers each correspond to one of a plurality of different locations, the generating comprising:

embedding the telephone number in the second advertisement, the telephone number used by the user to initiate a telephone call to the connection server for further connection to an advertiser of the second advertisement; and transmitting the second advertisement with the telephone number of the connection server as a response to the request.

20. The system of claim 19, wherein the one or more servers coupled with the memory to execute the instructions such that the instructions are further configured to instruct the one or more servers to:

determine the location indicator of the request based on an indentifier of the user from whom the request is received.

* * * * *